US009421529B2

(12) United States Patent
Wu

(10) Patent No.: US 9,421,529 B2
(45) Date of Patent: Aug. 23, 2016

(54) METHODS OF REACTIVATING AN AROMATIZATION CATALYST

(71) Applicant: Chevron Phillips Chemical Company LP, The Woodlands, TX (US)

(72) Inventor: An-Hsiang Wu, Kingwood, TX (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 73 days.

(21) Appl. No.: 14/159,187

(22) Filed: Jan. 20, 2014

(65) Prior Publication Data
US 2014/0194275 A1 Jul. 10, 2014

Related U.S. Application Data

(63) Continuation of application No. 12/617,440, filed on Nov. 12, 2009, now Pat. No. 8,664,144.

(60) Provisional application No. 61/140,303, filed on Dec. 23, 2008, provisional application No. 61/140,314, filed on Dec. 23, 2008, provisional application No. 61/140,306, filed on Dec. 23, 2008.

(51) Int. Cl.
*B01J 29/90* (2006.01)
*B01J 23/96* (2006.01)
(Continued)

(52) U.S. Cl.
CPC *B01J 29/90* (2013.01); *B01J 23/96* (2013.01); *B01J 37/24* (2013.01); *B01J 37/26* (2013.01);
(Continued)

(58) Field of Classification Search
CPC .......... B01J 29/00; B01J 29/04; B01J 29/005; B01J 29/06; B01J 29/061; B01J 29/064; B01J 29/60; B01J 29/61; B01J 29/90; B01J 23/96; B01J 37/24; B01J 37/26; B01J 38/10; B01J 38/12; B01J 38/42; B01J 38/46; B01J 23/42; C10G 45/68; C10G 35/085; C10G 11/05

USPC .................................................. 502/20–56
See application file for complete search history.

(56) References Cited

U.S. PATENT DOCUMENTS 3,898,173 A   8/1975  Hayes
3,941,716 A   3/1976  Paynter
(Continued)

FOREIGN PATENT DOCUMENTS

EP   0278851 A2   8/1988
EP   0316727 A1   5/1989
(Continued)

OTHER PUBLICATIONS

Filing receipt and specification for provisional patent application entitled "Methods of Reactivating an Aromatization Catalyst," by An-Hsiang Wu, filed Dec. 23, 2008 as U.S. Appl. No. 61/140,306.
(Continued)

*Primary Examiner* — Jennifer A Smith
(74) *Attorney, Agent, or Firm* — Conley Rose, P.C.; Rodney B. Carroll; Monte R. Rhodes

(57) ABSTRACT

A method of reactivating a spent catalyst comprising a metal and a catalyst support, the method comprising redispersing the metal in the spent catalyst to produce a redispersed spent catalyst, contacting the redispersed spent catalyst with a reactivating composition to produce a redispersed, reactivated spent catalyst, and thermally treating the redispersed, reactivated spent catalyst to produce a reactivated catalyst. A method comprising employing a fresh aromatization catalyst in one or more reaction zones for a time period sufficient to produce a spent catalyst, reducing the amount of carbonaceous material associated with the spent catalyst to produce a decoked spent catalyst, contacting the decoked spent catalyst with a redispersing composition to produce a decoked redispersed spent, contacting the decoked redispersed spent catalyst with a reactivating composition to produce a decoked redispersed reactivated spent catalyst, and thermally treating the decoked, reactivated spent catalyst to produce a reactivated catalyst.

26 Claims, 5 Drawing Sheets

(51) Int. Cl.
  *B01J 37/24* (2006.01)
  *B01J 37/26* (2006.01)
  *B01J 38/12* (2006.01)
  *B01J 38/44* (2006.01)
  *B01J 38/46* (2006.01)
  *B01J 38/54* (2006.01)
  *C10G 45/68* (2006.01)
  *B01J 29/62* (2006.01)

(52) U.S. Cl.
  CPC *B01J 38/12* (2013.01); *B01J 38/44* (2013.01); *B01J 38/46* (2013.01); *B01J 38/54* (2013.01); *C10G 45/68* (2013.01); *B01J 29/62* (2013.01); *B01J 2229/42* (2013.01)

(56) References Cited

U.S. PATENT DOCUMENTS

| | | | |
|---|---|---|---|
| 4,444,895 A | 4/1984 | Fung et al. |
| 4,444,896 A | 4/1984 | Fung et al. |
| 4,444,897 A | 4/1984 | Fung et al. |
| 4,447,551 A | 5/1984 | Fung et al. |
| 4,467,045 A | 8/1984 | Fung |
| 4,472,514 A | 9/1984 | Fung |
| 4,472,515 A | 9/1984 | Fung |
| 4,473,656 A | 9/1984 | Fung et al. |
| 4,480,046 A | 10/1984 | Fung et al. |
| 4,491,635 A | 1/1985 | Fung et al. |
| 4,491,636 A | 1/1985 | Fung et al. |
| 4,492,767 A | 1/1985 | Fung |
| 4,493,901 A | 1/1985 | Bernard et al. |
| 4,539,304 A | 9/1985 | Field |
| 4,552,856 A | 11/1985 | Tauster et al. |
| 4,595,668 A | 6/1986 | Poeppelmeier et al. |
| 4,595,669 A | 6/1986 | Fung et al. |
| 4,595,670 A | 6/1986 | Tauster et al. |
| 4,634,517 A | 1/1987 | Tauster et al. |
| 4,645,751 A | 2/1987 | McCullen et al. |
| 4,648,960 A | 3/1987 | Poeppelmeier et al. |
| 4,657,874 A | 4/1987 | Borghard et al. |
| 4,678,764 A | 7/1987 | Le et al. |
| 4,681,865 A | 7/1987 | Katsuno et al. |
| 4,721,607 A | 1/1988 | Haddad et al. |
| 4,789,655 A | 12/1988 | Travers et al. |
| 4,810,683 A | 3/1989 | Cohn et al. |
| 4,822,762 A | 4/1989 | Ellig et al. |
| 4,824,816 A | 4/1989 | Trowbridge et al. |
| 4,835,129 A | 5/1989 | Travers et al. |
| 4,839,320 A | 6/1989 | Trowbridge et al. |
| 4,851,380 A | 7/1989 | Van Leirsburg et al. |
| 4,855,269 A | 8/1989 | Mohr |
| 4,872,970 A | 10/1989 | Boyle |
| 4,914,068 A | 4/1990 | Cross et al. |
| 4,925,819 A | 5/1990 | Fung et al. |
| 4,937,215 A | 6/1990 | Murakawa et al. |
| 5,021,377 A * | 6/1991 | Maholland ............ B01J 29/90 208/111.2 |
| 5,034,117 A | 7/1991 | De Bonneville et al. |
| 5,106,798 A | 4/1992 | Fung |
| 5,155,074 A | 10/1992 | Mohr |
| 5,185,306 A | 2/1993 | Cohn et al. |
| 5,196,631 A | 3/1993 | Murakawa et al. |
| RE34,250 E | 5/1993 | Van Leirsburg et al. |
| 5,220,108 A | 6/1993 | Hashimoto et al. |
| 5,256,612 A | 10/1993 | Fung |
| 5,260,238 A | 11/1993 | Murakawa et al. |
| 5,270,272 A | 12/1993 | Galperin et al. |
| 5,348,924 A | 9/1994 | Potter et al. |
| 5,378,669 A | 1/1995 | Fung |
| 5,491,119 A | 2/1996 | Verduijn |
| 5,552,035 A | 9/1996 | Potter et al. |
| 5,557,029 A | 9/1996 | Lin et al. |
| 5,573,988 A | 11/1996 | Didillon |
| 5,672,801 A | 9/1997 | Didillon |
| 5,683,573 A | 11/1997 | Haizmann et al. |
| 5,698,486 A | 12/1997 | Fung et al. |
| 5,712,214 A | 1/1998 | Huang et al. |
| 5,726,112 A | 3/1998 | Fung et al. |
| 5,755,956 A | 5/1998 | Galperin et al. |
| 5,756,414 A | 5/1998 | Huang et al. |
| 5,763,348 A | 6/1998 | Fung et al. |
| 5,776,849 A | 7/1998 | Fung et al. |
| 5,792,338 A | 8/1998 | Gosling et al. |
| 5,854,162 A | 12/1998 | Dufresne et al. |
| 5,866,495 A | 2/1999 | Fung et al. |
| 5,880,049 A | 3/1999 | Lacroix et al. |
| 5,880,050 A | 3/1999 | Boitiaux et al. |
| 5,883,031 A | 3/1999 | Innes et al. |
| 5,898,011 A | 4/1999 | Wu et al. |
| 5,935,415 A | 8/1999 | Haizmann et al. |
| 5,980,731 A | 11/1999 | Kao et al. |
| 6,034,019 A | 3/2000 | Fung et al. |
| 6,048,814 A | 4/2000 | Capelle et al. |
| 6,103,652 A | 8/2000 | Brunet et al. |
| 6,110,857 A | 8/2000 | Fung et al. |
| 6,133,183 A | 10/2000 | Capelle et al. |
| 6,147,022 A | 11/2000 | Brunet et al. |
| 6,190,539 B1 | 2/2001 | Holtermann et al. |
| 6,191,332 B1 | 2/2001 | Duee et al. |
| 6,277,335 B1 | 8/2001 | Capelle et al. |
| 6,291,381 B1 | 9/2001 | Lin et al. |
| 6,294,492 B1 | 9/2001 | Lin |
| 6,358,400 B1 | 3/2002 | Bogdan et al. |
| 6,380,119 B1 | 4/2002 | Grosch et al. |
| 6,410,472 B2 | 6/2002 | Macahan et al. |
| 6,426,052 B1 | 7/2002 | Capelle et al. |
| 6,472,340 B2 | 10/2002 | Lin |
| 6,593,264 B2 | 7/2003 | Lin et al. |
| 6,600,082 B2 | 7/2003 | Le Peltier et al. |
| 6,605,566 B2 | 8/2003 | Le Peltier et al. |
| 6,710,002 B2 | 3/2004 | Grosch et al. |
| 6,740,615 B2 | 5/2004 | Zhou |
| 6,784,132 B1 | 8/2004 | Sechrist |
| 6,790,802 B1 | 9/2004 | Sechrist |
| 6,833,338 B2 | 12/2004 | McDaniel et al. |
| 6,881,391 B1 | 4/2005 | Sechrist |
| 6,908,873 B2 | 6/2005 | Zhou et al. |
| 7,037,871 B1 | 5/2006 | Galperin et al. |
| 7,074,975 B2 | 7/2006 | Braun et al. |
| 7,153,801 B2 | 12/2006 | Wu |
| 7,233,710 B2 | 6/2007 | Wang et al. |
| 7,312,173 B1 | 12/2007 | Yuan et al. |
| 7,319,175 B2 | 1/2008 | Braun et al. |
| 7,582,272 B2 | 9/2009 | Glova et al. |
| 7,638,101 B2 | 12/2009 | Yuan et al. |
| 7,745,675 B2 | 6/2010 | Ellis et al. |
| 7,868,217 B2 | 1/2011 | Brown et al. |
| 7,985,381 B2 | 7/2011 | Sun et al. |
| 8,516,522 B2 | 8/2013 | Moon et al. |
| 8,664,144 B2 | 3/2014 | Wu |
| 8,664,145 B2 | 3/2014 | Wu |
| 8,716,161 B2 | 5/2014 | Wu |
| 2005/0027648 A1 | 2/2005 | Knowles et al. |
| 2010/0160702 A1 | 6/2010 | Wu |
| 2010/0222202 A1 | 9/2010 | Nabozny et al. |
| 2012/0093699 A1 | 4/2012 | Nabozny et al. |
| 2013/0231511 A1 | 9/2013 | Wu |
| 2013/0231512 A1 | 9/2013 | Wu |

FOREIGN PATENT DOCUMENTS

| | | |
|---|---|---|
| EP | 0378482 A1 | 7/1990 |
| EP | 0294448 B1 | 8/1991 |
| EP | 0294477 B1 | 9/1992 |
| EP | 0334562 B1 | 3/1993 |
| EP | 0535619 A1 | 4/1993 |
| EP | 0548421 A1 | 6/1993 |
| EP | 0710502 A1 | 5/1996 |
| EP | 0872276 A1 | 10/1998 |
| EP | 0872277 A1 | 10/1998 |
| EP | 0873785 A1 | 10/1998 |
| FR | 2325289 A7 | 4/1977 |
| GB | 760612 | 11/1956 |
| WO | 9624834 A1 | 8/1996 |

(56) References Cited

FOREIGN PATENT DOCUMENTS

| WO | 9847615 | A1 | 10/1998 |
|----|---------|----|---------|
| WO | 2010075133 | A1 | 7/2010 |
| WO | 2010075134 | A2 | 7/2010 |
| WO | 2010075134 | A3 | 7/2010 |
| WO | 2010075135 | A2 | 7/2010 |
| WO | 2010075135 | A3 | 7/2010 |

OTHER PUBLICATIONS

Filing receipt and specification for provisional patent application entitled "Methods of Preparing an Aromatization Catalyst," by An-Hsiang Wu, filed Dec. 23, 2008 as U.S. Appl. No. 61/140,314.

Filing receipt and specification for provisional patent application entitled "Methods of Preparing an Aromatization Catalyst," by An-Hsiang Wu, filed Dec. 23, 2008 as U.S. Appl. No. 61/140,303.

Foreign communication from a related counterpart application—International Search Report and Written Opinion, PCT/US2009/068266, May 25, 2010, 17 pages.

Foreign communication from a related counterpart application—International Preliminary Report on Patentability, PCT/US2009/068266, Jun. 29, 2011, 8 pages.

Foreign communication from a related counterpart application—International Search Report and Written Opinion, PCT/US2009/068267, Jun. 30, 2010, 18 pages.

Foreign communication from a related counterpart application—International Preliminary Report on Patentability, PCT/US2009/068267, Jun. 29, 2011, 9 pages.

Foreign communication from a related counterpart application—Invitation to Pay Additional Fees, PCT/US2009/068268, May 27, 2010, 11 pages.

Foreign communication from a related counterpart application—International Search Report and Written Opinion, PCT/US2009/068268, Aug. 26, 2010, 22 pages.

Foreign communication from a related counterpart application—International Preliminary Report on Patentability, PCT/US2009/068268, Jun. 29, 2011, 12 pages.

Foreign communication from a related counterpart application—Examination Report, Gulf Cooperation Council Application No. GCC/P/2009/14817, May 23, 2013, 7 pages.

Fukunaga, Tetsuya, et al., "Halogen-promoted Pt/KL Zeolite Catalyst for the Production of Aromatic Hydrocarbons from Light Naphtha," Catal Surv Asia, 2010, vol. 14, pp. 96-102, Springer Science+Business Media, LLC.

Fung, S. C., "Deactivation and Regeneration/Redispersion Chemistry of Pt/KL-Zeolite," Catalyst Deactivation 2001, Studies in Surface Science and Catalysis, 2001, vol. 139, 11 pages, Elsevier Science B.V.

Office Action dated Oct. 28, 2011 (32 pages), U.S. Appl. No. 12/617,451 filed Nov. 12, 2009.

Office Action dated Feb. 15, 2012 (14 pages), U.S. Appl. No. 12/617,451 filed Nov. 12, 2009.

Office Action (Final) dated May 29, 2012 (17 pages), U.S. Appl. No. 12/617,451 filed Nov. 12, 2009.

Office Action dated Mar. 5, 2013 (20 pages), U.S. Appl. No. 12/617,451 filed Nov. 12, 2009.

Office Action (Final) dated Jul. 2, 2013 (13 pages), U.S. Appl. No. 12/617,451 filed Nov. 12, 2009.

Advisory Action dated Sep. 9, 2013 (3 pages), U.S. Appl. No. 12/617,451 filed Nov. 12, 2009.

Examiners Answer dated Jan. 15, 2014 (15 pages), U.S. Appl. No. 12/617,451 filed Nov. 12, 2009.

Foreign communication from a related counterpart application—Novelty Search Report, Gulf Cooperation Council Application No. GCC/P/2009/14817, Jun. 6, 2013, 3 pages.

Foreign communication from a related counterpart application—Examination Report, Gulf Cooperation Council Application No. GCC/P/2009/14817, Sep. 15, 2014, 4 pages.

Foreign communication from a related counterpart application—Search Report, Singapore Application No. 11201405277Q, Apr. 24, 2015, 3 pages.

Foreign communication from a related counterpart application—Written Opinion, Singapore Application No. 11201405277Q, May 15, 2015, 5 pages.

Foreign communication from a related counterpart application—Invitation to Respond to Written Opinion, Singapore Application No. 11201405277Q, Jul. 6, 2015, 2 pages.

* cited by examiner

METHODS OF REACTIVATING AN AROMATIZATION CATALYST

CROSS-REFERENCE TO RELATED APPLICATION

This application is a continuation of and claims priority to U.S. patent application Ser. No. 12/617,440 filed on Nov. 12, 2009, published as U.S. Publication No. 2010/0160147 A1, which claims priority to U.S. Provisional Patent Application Ser. Nos. 61/140,306, entitled "Methods of Reactivating an Aromatization Catalyst," 61/140,303 and 61/140,314, both entitled "Methods of Preparing an Aromatization Catalyst," and all of which filed Dec. 23, 2008. The subject matter of the present application is related to U.S. patent application Ser. No. 12/617,451 and U.S. patent application Ser. No. 12/617,483 filed Nov. 12, 2009 and both entitled "Methods of Preparing an Aromatization Catalyst." Each of the above identified applications is hereby incorporated herein by reference in its entirety for all purposes.

FIELD

The present disclosure relates to aromatization of hydrocarbons with an aromatization catalyst. Specifically, the disclosure relates to methods of reactivating an aromatization catalyst.

BACKGROUND

The catalytic conversion of hydrocarbons into aromatic compounds, referred to as aromatization is an important industrial process used to produce fundamental building block chemicals on which a large portion of the chemical industry is based. The aromatization reactions may include the dehydrogenation, isomerization, and hydrocracking of hydrocarbons, each of which produces certain aromatic compounds. These reactions are generally conducted in one or more aromatization reactors containing aromatization catalysts. These catalysts may increase the selectivity to desired aromatic compounds, and/or the conversion rates of the reaction to the desired aromatic compounds. While under commercial aromatization conditions, these catalysts slowly lose activity as evidenced by a loss of selectivity to desired products and/or a reduction in conversion rates. For example, the catalysts may be poisoned by the presence of contaminants thus degrading their activities. Continued use of the catalyst may result in a catalyst that no longer efficiently catalyzes a user-desired process and/or produces significant byproducts, termed a spent catalyst. Given their commercial importance and the expense incurred in producing fresh catalyst to replace spent catalyst, an ongoing need exists for improved methods of restoring catalytic activity to spent aromatization catalysts.

SUMMARY

Disclosed herein is a method of reactivating a spent catalyst comprising a metal and a catalyst support, the method comprising redispersing the metal in the spent catalyst to produce a redispersed spent catalyst, contacting the redispersed spent catalyst with a reactivating composition to produce a redispersed, reactivated spent catalyst, and thermally treating the redispersed, reactivated spent catalyst to produce a reactivated catalyst.

Also disclosed herein is a method comprising employing a fresh aromatization catalyst in one or more reaction zones for a time period sufficient to produce a spent catalyst, reducing the amount of carbonaceous material associated with the spent catalyst to produce a decoked spent catalyst, contacting the decoked spent catalyst with a redispersing composition to produce a decoked redispersed spent, contacting the decoked redispersed spent catalyst with a reactivating composition to produce a decoked redispersed reactivated spent catalyst, and thermally treating the decoked, reactivated spent catalyst to produce a reactivated catalyst.

Further disclosed herein is a method comprising preparing a fresh catalyst comprising a metal and a catalyst support, employing the fresh catalyst in a reaction zone for a time period sufficient to produce a spent catalyst, removing the spent catalyst from the reaction zone, and treating the spent catalyst with at least two halide-containing compositions wherein at least one of the halide-containing compositions comprises fluoride.

Further disclosed herein is a method comprising preparing a fresh catalyst comprising a metal and a catalyst support, employing the fresh catalyst in a reaction zone for a time period sufficient to produce a spent catalyst, and treating the spent catalyst in the reaction zone with at least two halide-containing compositions, wherein at least one of the halide-containing compositions comprise a fluorine-containing composition and wherein the halide-containing compositions are noncorrosive; form noncorrosive products; or combinations thereof and are compatible with the components and equipment disposed within the reaction zone.

DETAILED DESCRIPTION

Figure 1:
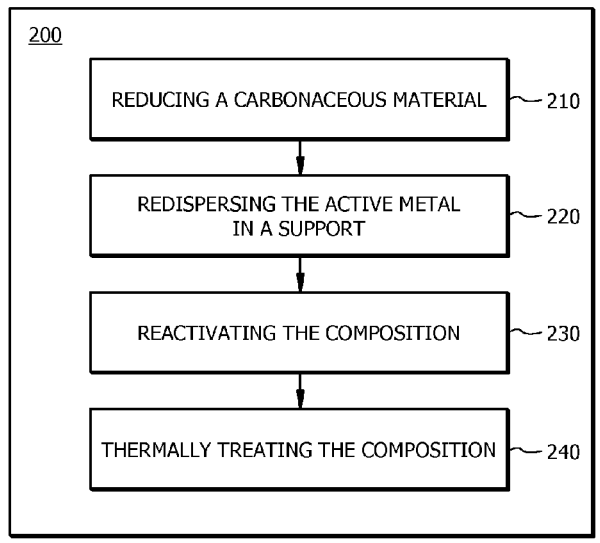
FIG. 1 is a flowchart of a method of reactivating a spent catalyst.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of restoring the activity of a spent catalyst by a reactivating process. In an embodiment, the method comprises obtaining a spent catalyst comprising a metal and a catalyst support, redispersing the metal about the catalyst support, and reactivating the catalyst to restore at least a portion of the catalytic activity. In an embodiment, the catalyst is an aromatization catalyst that is used to convert hydrocarbons into aromatic compounds. Generally, these conversions of hydrocarbons into aromatics are carried out in one or more aromatization reactors.

While under catalytic conditions the activity of a catalyst will decrease as a function of reaction time resulting in a "spent" catalyst such that while a fresh catalyst had an activity x, the spent catalyst has an activity y wherein x is greater than y. In an embodiment, the catalytic activity of the spent catalyst may be increased by reactivation of the spent catalyst, resulting in a catalytic activity z wherein z is greater than y but less than x (y<z<x). Methods of restoring activity to a spent catalyst are described in more detail later herein.

Hereinafter, the disclosure will focus on the reactivation of a spent aromatization catalyst which will be referred to generally as the "catalyst." However, it is contemplated that one of ordinary skill in the art with the benefits of this disclosure may employ similar methodologies to reactivate other catalyst types.

In an embodiment, the spent catalysts disclosed herein comprise a catalyst support, one or more catalytically active metals, and at least two halides.

In an embodiment, the catalyst support comprises an inorganic oxide. These inorganic oxides may include bound medium and/or large pore zeolites (aluminosilicates), amorphous inorganic oxides and mixtures thereof. Large pore zeolites include, but are not limited to, L-zeolite, Y-zeolite, mordenite, omega zeolite, beta zeolite, or other types of zeolites. Amorphous inorganic oxides include, but are not limited to, aluminum oxide, silicon oxide, and titania. The support may further comprise a bonding agent such as for example silica, alumina, clays, titania, and magnesium oxide.

In an embodiment, the catalyst support comprises a medium or large pore zeolite. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to 2. The framework exhibits a negative electrovalence that typically is balanced by the inclusion of cations within the crystal such as metals, alkali metals, alkaline earth metals, or hydrogen.

In an embodiment, the catalyst support comprises an L-type zeolite. L-type zeolite supports are a sub-group of zeolitic supports. Typical L-type zeolites contain mole ratios of oxides in accordance with the following formula:

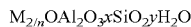

$$M_{2/n}O \cdot Al_2O_3 \cdot xSiO_2 \cdot yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite.

In an embodiment, the catalyst support comprises a bound potassium L-type zeolite, also referred to as KL zeolite. The term "KL zeolite" as used herein refers to L-type zeolites in which the principal cation M incorporated in the zeolite is potassium. A KL zeolite may be cation-exchanged or impregnated with another metal and one or more halides to produce a platinum-impregnated, halided zeolite or a KL supported Pt-halide zeolite catalyst. In some embodiments, the support is a KL zeolite. In other embodiments, the catalyst support may comprise a mixture of a zeolite and an inorganic oxide.

The catalyst support may contain up to about 95 wt. % L-zeolite by total weight of the support, alternatively about 60 wt % to about 95 wt. %, alternatively from about 70 wt % to about 92 wt. %, alternatively from about 80 wt % to about 90 wt. %. Herein weight percentage by total weight of the catalyst support refers to the weight percentage of the component based on the final weight of the catalyst support after all of the catalyst processing steps.

In an embodiment, the spent catalyst comprises one or more catalytically active metals. Examples of such metals include without limitation Group IB metals and Group VIII transition metals of the Periodic Table such as iron, cobalt, nickel, ruthenium, rhodium, palladium, osmium, iridium, platinum, gold, silver, copper, or combinations thereof. In an embodiment, the metal comprises platinum (Pt).

In an embodiment, the metal may be present in the spent catalyst in an amount from about 0.1 wt. % to about 50 wt. % by total weight of the spent catalyst, alternatively from about 0.1 wt. % to about 10 wt. %, alternatively from about 0.2 wt. % to about 5 wt. %, alternatively from about 0.3 wt. % to about 3 wt. %, alternatively from about 0.3 wt. % to about 2 wt. %. As used herein, the weight percentage of metals are based on the total weight of the catalyst.

In an embodiment, the spent catalyst comprises at least two halides. Examples of suitable halides include chloride, fluoride, bromide, iodide, or combinations thereof. In an embodiment the catalyst comprises chloride. Chloride may be present in the catalyst in an amount of from about 0.1 wt. % to about 5 wt. % by total weight of the catalyst, alternatively from about 0.2 wt. % to about 3 wt. %, alternatively from about 0.3 wt. % to about 2 wt. %.

In an embodiment, the catalyst comprises fluoride. Fluoride may be present in the catalyst in an amount of from about 0.1 wt. % to about 10 wt % by total weight of catalyst, alternatively from about 0.2 wt. % to about 5 wt. %, alternatively from about 0.3 wt. % to about 3 wt. %.

In various embodiments, the catalyst comprises Pt, and chloride (Cl) in an atomic ratio of Pt:Cl from about 1.0:0.1 to about 1.0:10, alternatively from about 1.0:0.2 to about 1.0:5.0, alternatively from about 1.0:0.3 to about 1.0:3.0.

In an embodiment, a fresh catalyst may function to catalyze a user-desired process such as the aromatization of one of more hydrocarbons. As the catalyst is used for the conversion of hydrocarbons to desired products (e.g., aromatization), the catalyst activity will decrease with time due to a variety of factors. For example, carbonaceous materials may build up on the catalyst thus decreasing the number of catalytic sites available and the overall activity of the catalyst. In other instances, catalyst modifiers, or activity promoters, may have evolved from the catalyst over time resulting in lower activity or lower selectivity to the desired products. The activity or selectivity of the catalyst may decrease to a level wherein it is no longer beneficial to employ the catalyst in a user-desired process. Such catalysts are termed "spent" catalysts.

FIG. 1 is a flowchart of an embodiment of a method of reactivating a spent catalyst of the type described previously herein (i.e., aromatization catalyst comprising a metal and a catalyst support). Referring to FIG. 1, a method 200 of reactivating a spent catalyst may comprise reducing the amount of carbonaceous material present in the spent catalyst, Block 210. The material may be further processed by redispersing the metal about the catalyst support, Block 220. The metal may be redispersed via contact with one or more additional compounds (e.g., redispersing compounds). The metal may be redispersed about the periphery of the catalyst, in one or more layers of the catalyst (e.g., a skin layer), throughout the catalyst, or various combinations thereof, and such dispersion may be uniform or non-uniform. The metal in the catalyst support may then be reactivated by contacting the material with a reactivating composition comprising one or more halides Block 230, and the method 200 may conclude with thermal treatment of the composition, Block 240.

A method of reactivating the catalyst may initiate by reducing the amount of carbonaceous material associated with the catalyst, Block 210, a process generally termed decoking. The decoking process involves conversion of the carbonaceous material to carbon oxides and water and may be carried out by heating the spent catalyst in a temperature ranging of from about 25° C. to about 1000° C., alternatively from about 50° C. to about 900° C., alternatively from about 100°

C. to about 800° C., alternatively from 200° C. to 700° C., alternatively from 300° C. to 600° C. to produce a decoked spent catalyst. The decoking process may be carried out by heating the spent catalyst for a time of from about 1 hours to about 40 hours, alternatively from about 2 hours to about 25 hours, alternatively from about 3 hours to about 20 hours, alternatively from 4 hours to 15 hours, alternatively from 5 hours to 10 hours to produce a decoked spent catalyst. The decoking process may be carried out by heating the spent catalyst in the presence oxygen, the oxygen concentration being from about 0.01 mol % to about 20 mol % alternatively from about 0.1 mol % to about 15 mol % alternatively from about 0.2 mol % to about 10 mol % alternatively from 0.5 mol % to 5 mol % alternatively from 1 mol % to 3 mol % to produce a decoked spent catalyst.

Following decoking of the spent catalyst, Block 210, the metal on the decoked spent catalyst may be redispersed on the catalyst support, Block 220. While not wishing to be bound by theory, the decoking process described previously, in addition to the hydrocarbon conversion process that the spent catalyst was subjected to, may have lead to the agglomeration of the metal on the catalyst support. The agglomerated metal is not fully available physically and chemically to the catalytic reactions and thus should be redispersed if maximum catalyst activity is to be restored. In an embodiment, the metal on the decoked spent catalyst is redispersed by a number of processes generally referred to as oxychlorination. Oxychlorination of the decoked spent catalyst may be carried out by contacting the decoked spent catalyst with a redispersing composition of the type and under the conditions described herein.

In an embodiment, the decoked, spent catalyst is contacted with a redispersing composition comprising a chorine-containing compound and oxygen. The chlorine-containing compound may be in the solid phase, liquid phase, gas phase, or combinations thereof. Examples of chlorine-containing compounds suitable for use in the redispersing composition include without limitation hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, or combinations thereof.

Contacting of the decoked, spent catalyst with the redispersing composition may be carried out over a time period of from about 0.5 hours to about 50 hours, alternatively from about 1 hour to about 20 hours, alternatively from about 2 hours to about 10 hours, at a temperature in the range of from about 25° C. to about 1000° C., alternatively from about 50° C. to about 900° C., alternatively from about 100° C. to about 800° C., alternatively from about 200° C. to about 400° C., alternatively from about 400° C. to about 600° C. Contacting of the decoked, spent catalyst with the redispersing composition may be carried out in the presence of oxygen. When oxygen is used the oxygen concentration used is from about 0.01 mol % to about 20 mol %, alternatively from about 1 mol % to about 18 mol %, alternatively from about 5 mol % to about 15 mol %, alternatively from about 8 mol % to about 12 mol %.

In an alternative embodiment, the decoked, spent catalyst is contacted with a redispersing composition comprising a chorine-containing compound of the type described herein (e.g., HCl) and oxygen in the presence of water. When water is used, the water to HCl mole ratio ($H_2O$:HCl) may be from about 0.01:1 to about 10:1, alternatively from about 0.5:1 to about 5:1, alternatively from about 1:1 to about 3:1. When chorine-containing compounds are used other than HCl, the $H_2O$:HCl mole ratio is calculated based on the equivalent amount of HCl generated in the presence of the spent catalyst.

In an embodiment, a weak base may be included while the metal is being redispersed in order to neutralize any free acids that may be present. An example of weak base suitable for use in this disclosure includes without limitation ethylene diamine (EDA). The resulting material is a decoked redispersed spent catalyst which may be further dried under suitable conditions. In addition, or in the alternative the decoked redispersed spent catalyst may be calcined in a temperature range of from about 25° C. to about 1000° C., alternatively from about 50° C. to about 900° C., alternatively from about 100° C. to about 800° C., alternatively from 200° C. to 700° C., alternatively from about 300° C. to about 600° C. The calcination may be carried out for a time of from about 1 hour to about 40 hours, alternatively from about 2 hours to about 25 hours, alternatively from about 3 hours to about 20 hours, alternatively from about 4 hours to about 15 hours, alternatively from about 5 hours to about 10 hours. The calcination process may be carried out by heating the decoked redispersed spent catalyst in the presence of oxygen, the oxygen concentration being from about 0.01 mol % to about 20 mol % alternatively from about 0.1 mol % to about 15 mol % alternatively from about 0.2 mol % to about 10 mol % alternatively from about 0.5 mol % to about 5 mol % alternatively from about 1 mol % to about 3 mol %.

The method of reactivating a spent catalyst 200, may then proceed to Block 230 wherein the decoked redispersed spent catalyst is subjected to at least one reactivation step. Reactivation of the decoked, redispersed spent catalyst may be carried out using a reactivating composition comprising one or more halogenating agents, including gas phase halogenating agents, liquid phase halogenating agents, solid phase halogenating agents, or combinations thereof. In an embodiment, reactivation of the decoked redispersed spent catalyst is carried out by contacting the decoked redispersed spent catalyst with a fluorine-containing solution a process generally referred to as fluoridation. The fluorine-containing compound may be in the solid phase, liquid phase, gas phase, or combinations thereof. Examples of fluorine-containing compounds suitable for use in this disclosure include without limitation tetramethylammonium fluoride (TMAF), ammonium fluoride ($NH_4F$ or AF), tetrafluoroethylene, 2,2,2-trifluoroethanol (TFE), fluorine ($F_2$), hydrofluoric acid (HF), or combinations thereof. In an embodiment, the fluorine-containing compound is a perfluorinated alkane, perfluorinated alcohol or mixtures thereof. Examples of perfluorinated alcohols suitable for use in this disclosure include without limitation 2,2,2-trifluoroethanol (TFE), hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, and combinations thereof.

In an embodiment, the fluorine-containing compound is an organic ammonium halide compound and may comprise one or more compounds represented by the general formula $N(R)_4F$, where R represents a hydrogen or a substituted or unsubstituted carbon chain molecule having from 1 to 20 carbons wherein each R may be the same or different. In an embodiment, R is methyl, ethyl, propyl, butyl, or combinations thereof. Alternatively R is methyl. Examples of suitable organic ammonium compounds include ammonium fluoride (AF), tetramethylammonium fluoride (TMAF), tetraethylammonium fluoride (TEAF), tetrapropylammonium fluoride, tetrabutylammonium fluoride, methyltriethylammonium fluoride, or combinations thereof. Alternatively, the organic ammonium halide compound may also comprise at least one hydrofluoric acid and at least one ammonium hydroxide represented by the formula $N(R')_4OH$, where R' is hydrogen or a substituted or unsubstituted carbon chain molecule having from 1 to 20 carbon atoms wherein each R' may be the same or different. In an embodiment, R' is methyl, ethyl, propyl, butyl, or combinations thereof. Alternatively R' is methyl. Examples of organic ammonium hydroxides suitable for use in this disclosure include ammonium hydroxide, tetraalkylammonium hydroxides such as tetramethylammonium hydroxide, tetraethylammonium hydroxide, tetrapropylammonium hydroxide, tetrabutylammonium hydroxide, or combinations thereof.

In an embodiment the decoked redispersed spent catalyst is contacted with a solution of TMAF in the temperature range of from about 0° C. to about 200° C., alternatively from about 20° C. to about 100° C., alternatively from about 40° C. to about 60° C. for a time period of from about 1 minute to about 100 hours, alternatively about 0.1 hours to about 50 hours, alternatively from about 1 hour to about 24 hours. The solution also contains any suitable solvent.

In an alternative embodiment, the decoked, redispersed spent catalyst is reactivated by contacting with a gas phase fluoridating agent such as for example fluorine. In such an embodiment, the gas phase fluoridating agent may be contacted with a decoked redispersed spent catalyst for a time period of from about 1 minute to about 100 hours, alternatively from about 0.1 hours to about 50 hours, alternatively from about 1 hour to about 24 hours, alternatively from about 4 hours to about 11 hours.

In an alternative embodiment, the decoked, redispersed spent catalyst is reactivated by contacting with a solid phase fluoridating agent such as an organic ammonium halide compound for example ammonium fluoride, tetramethylammonium fluoride, or combinations thereof. In such an embodiment, the solid phase fluoridating agent may be contacted with a decoked redispersed spent catalyst at elevated temperatures. The contacting may occur for a time period of from about 1 minute to about 100 hours, alternatively from about 0.1 hours to about 50 hours, alternatively from about 1 hour to about 24 hours, alternatively from about 4 hours to about 11 hours. The elevated temperatures may in the temperature range of from about 0° C. to about 200° C., alternatively from about 20° C. to about 100° C., alternatively from about 40° C. to about 60° C. While not wishing to be limited by theory it is believed that under these conditions some of the solid phase fluoridating agent sublimes and migrates into the decoked, redispersed spent catalyst.

In the reactivation of the decoked redispersed spent catalyst a chorine-containing compound may also be utilized. The chlorine-containing compound may be in the solid phase, liquid phase, gas phase, or combinations thereof. In an embodiment, the chlorine-containing compound is of the type previously described herein. Examples of chlorine-containing compounds suitable for use in the reactivating composition include without limitation compounds represented by the general formula N(R)$_4$Cl, where R represents a hydrogen or a substituted or unsubstituted carbon chain molecule having 1 to 20 carbons wherein each R may be the same or different. In an embodiment, R is methyl, ethyl, propyl, butyl, or combinations thereof. Alternatively R is methyl. Specific examples of suitable organic ammonium chlorine compounds include ammonium chloride, tetramethylammonium chloride (TMAC), tetraethylammonium chloride, tetrapropylammonium chloride, tetrabutylammonium chloride, methyltriethylammonium chloride, or combinations thereof. Alternatively, the chorine-containing compound is TMAC.

In any of the aforementioned methods for reactivating the decoked, redispersed spent catalyst, the resulting composition may be dried in a temperature range of from about 0° C. to about 250° C., alternatively from about 25° C. to about 200° C., alternatively from about 50° C. to about 150° C. and/or calcined in a temperature range of from about 25° C. to about 1000° C., alternatively from about 50° C. to about 900° C., alternatively from about 100° C. to about 800° C. The drying and or calcining may occur at ambient pressures, or under a vacuum. During the drying and or calcining the contacted decoked redispersed spent catalyst particles may be stationary, or moving. For example in a rotary dryer. In an embodiment, a weak base may be included during the reactivation of the metal to neutralize free acids that may be present. An example of weak base suitable for use in this disclosure includes without limitation EDA. Following fluoridation, the resulting composition is a decoked, redispersed, reactivated spent catalyst.

In an alternative embodiment, the decoked, redispersed, reactivated spent catalyst is subjected to multiple reactivation steps. The reactivation steps may be the same, alternatively the reactivation steps may differ. For example, a decoked redispersed spent catalyst may be subjected to multiple reactivations with a gas phase fluoridating agent. Alternatively a decoked redispersed spent catalyst may be subjected to a first reactivation with a liquid phase fluoridating agent and a second reactivation with a gas phase fluoridating agent. In an embodiment, the decoked redispersed spent catalyst is subjected to two reactivation steps.

The method of reactivating a spent catalyst 200, may conclude at Block 240 wherein the decoked, redispersed, reactivated spent catalyst is thermally treated as described previously herein to produce a decoked redispersed reactivated thermally treated spent catalyst. Thermal treatment may be carried out in stationary or flowing gas (i.e. hydrogen, oxygen, air, helium, nitrogen, argon, etc). For example, the thermal treatment may be carried out in a flowing gas comprising nitrogen and/or oxygen, air, nitrogen diluted air, or combinations thereof. In an embodiment, the thermal treatment comprises calcination and the calcination process may be carried out by heating the spent catalyst in the presence of oxygen, the oxygen concentration being from about 0.01 mol % to about 20 mol % alternatively from about 0.1 mol % to about 18 mol % alternatively from about 0.2 mol % to about 15 mol %, alternatively from about 1 mol % to about 11 mol %, alternatively from about 4 mol % to about 9 mol %. In an embodiment, the decoked redispersed reactivated spent catalyst is thermally treated by calcining in a temperature range of from about 25° C. to about 1000° C., alternatively from about 50° C. to about 900° C., alternatively from about 100° C. to about 800° C., alternatively from about 200° C. to about 700° C., alternatively from about 300° C. to about 600° C. The calcination may be carried out for a time of from about 1 hour to about 40 hours, alternatively from about 2 hours to about 25 hours, alternatively from about 3 hours to about 20 hours, alternatively from about 4 hours to about 15 hours, alternatively from about 5 hours to about 10 hours. The calcination process may be carried out by heating the decoked redispersed reactivated catalyst in the presence of oxygen, the oxygen concentration being from about 0.01 mol % to about 20 mol % alternatively from about 0.1 mol % to about 15 mol % alternatively from about 0.2 mol % to about 10 mol % alternatively from about 0.5 mol % to about 5 mol % alternatively from about 1 mol % to about 3 mol %. Upon completion of the process described herein, the decoked, redispersed, reactivated, thermally treated spent catalyst is referred to as a reactivated catalyst.

The activity of the reactivated catalyst may be denoted z while that of the fresh catalyst is denoted x where x is greater than z. In an embodiment, the reactivated catalyst may have an activity z of from about 0.001x to about 0.95x, alternatively from about 0.7x to about 0.95x, alternatively from about 0.8x to about 0.95x, alternatively about 0.95x.

After the herein described reactivation method, the metal may be present in the reactivated catalyst in an amount from about 0.1 wt. % to about 50 wt. % by total weight of the spent catalyst, alternatively from about 0.1 wt. % to about 10 wt. %, alternatively from about 0.2 wt. % to about 5 wt. %, alternatively from about 0.3 wt. % to about 3 wt. %, alternatively from about 0.3 wt. % to about 2 wt. %. As used herein, the weight percentage of metals are based on the total weight of the catalyst. Chloride may be present in the reactivated catalyst in an amount of from about 0.1 wt. % to about 10 5 wt. % by total weight of the catalyst, alternatively from about 0.2 wt. % to about 5 3 wt. %, alternatively from about 0.3 wt. % to about 3 2 wt. %. Fluoride may be present in the reactivated catalyst in an amount of from about 0.1 wt. % to about 10 wt % by total weight of catalyst, alternatively from about 0.2 wt. % to about 5 wt. %, alternatively from about 0.3 wt. % to about 3 wt. %, alternatively from about 0.6 wt. % to about 2 wt. %.

In an embodiment, the methods described herein for processing a spent catalyst are carried out on a catalyst that has been removed from one or more reaction zones and are termed ex-situ processes. Ex-situ processes comprising the redispersion and reactivation of active metal sites may result in a catalyst having an increased activity when compared to other processes lacking both redispersion and reactivation of active metal sites.

In an alternative embodiment, a spent catalyst may be subjected to one or more redispersion and reactivation processes as described herein while the catalyst is still located within one or more reaction zones and are termed in-situ processes. In such embodiments, the processes may be carried out under milder conditions using compositions which are milder and designed to protect the existing process equipment. Such compositions when employed in a reaction zone may not substantially degrade or otherwise detrimentally affect the equipment disposed within the reaction zone. For example, the compositions used for reactivation of a spent catalyst in situ may be noncorrosive and/or form noncorrosive materials when employed in the reactivation process.

Regardless of whether the process is carried out in-situ or ex-situ, it is to be understood however that the embodiments set forth are illustrative and may be modified by one of ordinary skill in the art to meet the needs of the user and/or process. For example, the processes described herein may be carried out on catalyst located ex-situ, alternatively the processes may be carried out on catalyst located in-situ. Alternatively, at least a portion of the process described herein may be carried out in situ while some other portion of the process is carried out ex-situ.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

In the following examples, the spent catalysts used were aromatization catalysts of the type described previously herein. Specifically, the spent catalysts were characterized as having a catalyst support containing a silica bound KL zeolite containing about 0.5% to 1% Pt and initially contained at least two halides. These particular spent catalysts were obtained from a large-scale aromatization reactor and had exhausted their commercially useful activity over a period of many months. For safety reasons the spent catalyst was pretreated prior to removal from the large-scale aromatization reactor for these reactivation experiments in an $O_2/N_2$ mixture with 2% volume of $O_2$ at 400° F., which did not affect the results described herein. Unless otherwise indicated, the reactivation of spent catalyst was carried out using the following general procedure: (i) reducing the carbonaceous material from the spent aromatization catalyst comprising an active Pt by decoking; (ii) redispersing the Pt on the spent aromatization catalyst; (iii) contacting the Pt dispersed in the KL zeolite with a reactivating composition and (iv) thermally treating the activated composition to produce the reactivated catalyst.

Finally, the reactivation of spent catalyst was carried out using the following general procedure: (i) reducing the carbonaceous material from the spent aromatization catalyst comprising an active Pt by decoking; (ii) contacting the catalyst with a reactivating composition; and (iii) reactivating the Pt dispersed in the KL zeolite to produce the reactivated catalyst.

The samples produced in the following examples were then tested for their fouling rates which correlate to their activities by $y=fx+$initial $T_{60}$ wherein y is temperature, f is the fouling rate, x is time, and initial $T_{60}$ is the initial start of run temperature.

The fouling rate of reactivated catalyst samples was determined by plotting the temperature required to maintain a total yield of benzene and toluene at 60 wt. % over time at standard test conditions, as described later herein. The fouling rates were then determined from the calculated slopes fit to the resulting data. In each of the following examples, the following standard test conditions were utilized, the reactivated catalysts were grounded and sieved to about 20-40 mesh, and 1 gram of the sieved catalyst was placed in a reactor comprising a ¼ inch OD stainless steel reactor vessel in a temperature controlled furnace. After reducing the catalyst under flowing hydrogen, a feed stream of aliphatic hydrocarbon and hydrogen was introduced to the reactor vessel at a feed rate of 22 mL/min; a pressure of 50 psig; an $H_2$:hydrocarbon mole ratio of 3:1, and a liquid hourly space velocity (LHSV) of 9 $hr^{-1}$ to obtain performance data. The aliphatic hydrocarbon contained the following weight percentages of normal paraffins and isoparaffins; 8 wt. % $C_8$ paraffins, 28 wt. % $C_7$ paraffins, and 62 wt. % $C_6$ paraffins. The reactor effluent composition was analyzed by gas chromatography to indicate the amount of benzene and toluene. In each of the examples following the described experimental procedure and/or parameters, the process condition variations are the catalyst performance as evaluated by determining the catalyst fouling rates; the initial start of run temperature denoted initial $T_{60}$ (° F.); the time onstream (hr) denoted TOS; the end of run temperature denoted final $T_{60}$ (° F.); and other parameters as indicated, tabulated, and collectively referred to as the results.

Example 1

The effect of the oxychlorination time period during the reactivation of spent aromatization catalyst samples on the performance of such catalyst was investigated. Three spent aromatization catalyst samples, designated Samples 1-3, were obtained and weighted at 60 grams each. The samples were decoked by exposure to an oxygen/nitrogen mixture containing approximately 20 mole % of oxygen flowing at 500 ml/minute at 525° C. for 2 hours at 0.5° C./min. The samples were subsequently oxychlorinated by exposure to a bubbler of air/$N_2$ mixture at a flow rate of a 200 ml/min along with a continuous feed of HCl for 1, 2, or 4 hours. The amount of HCl introduced to the catalyst samples was sufficient to maintain a preselected molar ratio of HCl:$H_2O$:$O_2$:$N_2$. The preselected molar ratio for Sample 1 was about 1:3:9:87, for Sample 2 was about 2:7:9:82, and for Sample 3 was about 3:9:9:79.

After oxychlorination, the temperature was reduced to about 360° C. (for Samples 1 and 2) or about 350° C. (for Sample 3) and the HCl feed was removed. The exposure to a flowing air/$N_2$ mixture was continued for 2 more hours. The samples were then weighted at 24.59 grams (g), 26.38 g, and 23.19 g for Samples 1-3 respectively. The samples were then fluoridated with TMAF by taking 6.15 g, 6.22 g, and 6.22 g of Samples 1-3, and impregnated with 2.8 g of previously made TMAF solution containing 44 g of 25 wt % TMAOH solution, 26 g of 8 wt % HF solution, and 10 g of water. The fluoridated samples were left under ambient conditions for 18 to 20 hours before being dried at 105° C. for 2 hours and subsequently heat treated at 350° C. for 2 hours in a static air muffle furnace. In Samples 1-3, the amount of reactivated catalyst was 6.15 g, 6.20 g, and 6.16 g respectively. The performance of the catalyst samples was evaluated and the results are tabulated in Table 1.

TABLE 1

| Sample # | Oxychlorination Time (hr) | Initial $T_{60}$ (° F.) | TOS (hr) | Final $T_{60}$ (° F.) | Fouling Rate (° F./$10^3$ hr) |
|---|---|---|---|---|---|
| 1 | 4 | 912 | 1437 | 981 | 41 |
| 2 | 2 | 918 | 308 | 941 | 52 |
| 3 | 1 | 923 | 115 | 948 | 217 |

Referring to Table 1, the results demonstrate that the fouling rate for the catalyst was significantly affected by the oxychlorination time. Sample 1 with the longest oxychlorination time had the lowest fouling rate.

Example 2

The effect of the fluoridation temperature during the reactivation of spent catalyst samples on the performance of the reactivated spent catalysts was investigated. One sample of fresh catalyst, designated Sample A, and five samples of spent catalyst, designated Samples 4-8, all originating from the same batch of spent catalyst were tested and compared. The spent aromatization catalyst samples were decoked, oxychlorinated, and then fluoridated. The first two steps (i.e., decoking and oxychlorination) were carried out as described in Example 1. The fluoridation step was carried out by impregnating 6.3 g of the oxychlorinated catalyst sample with 2.8 g of a TMAF solution containing 21.8 g of TMAOH, 5 g of 48 wt % HF solution, and 73.7 g of water. The sample was then calcined and the temperature of calcination referred to as the post-fluoridation (Post-F) temperature. The resulting catalyst samples were left under ambient conditions for 4 hours, dried, and calcined at various fluoridation temperatures similar to Example 1. The samples were then reacted and the catalyst fouling rates were determined as described previously. The performance of the catalyst samples was evaluated and the results are tabulated in Table 2.

TABLE 2

| Sample | Fluoride (wt %) | Post-F Temp (° C.) | Initial $T_{60}$ (° F.) | TOS (hr) | Final $T_{60}$ (° F.) | Fouling Rate (mF/hr) |
|---|---|---|---|---|---|---|
| A | 1.00 | Fresh | 929 | 168 | 954 | 157 |
| 4 | 0.00 | n/a | 925 | 20 | 940 | 772 |
| 5 | 1.01 | 325 | 925 | 90 | 919 | Not observed |
| 6 | 1.02 | 350 | 915 | 115 | 916 | 10 |
| 7 | 1.02 | 375 | 921 | 116 | 912 | Not observed |
| 8 | 1.02 | 400 | 925 | 116 | 933 | 60 |

The results demonstrate that Samples 5-7 with Post-F temperatures from 325° C. to 375° C. resulted in reactivated catalysts with better performance as evidenced by lower initial $T_{60}$'s and lower fouling rates. The fouling of catalysts 5 and 7 was not observed over the time period tested, but were less than the other samples (Samples A, 4, 6, and 8) over the same time period.

Example 3

The effect of the Post-F drying procedure used during the reactivation of spent catalyst samples on the performance of the resulting reactivated catalysts was investigated. The samples were reactivated by a method comprising decoking, oxychlorination, and chlorifluoridation. Decoking and oxychlorination steps were carried out as described in Example 1. The HCl was then removed and the temperature was reduced to 375° C. for 4 hours. 6.20 g of the resulting material was then impregnated with 2.80 g of a TMAF/TMAC mixture containing 60 g of a 25 wt % TMAOH solution, 5 g of a 48 wt % HF solution, 4 g of a 37 wt % HCl solution, and 31 g of water. The material was left under ambient conditions for 16 to 20 hours. The material was then separated into two samples, designated Samples 9 and 10, and dried under different conditions. Sample 9 was dried under vacuum at about 1 mmHg at 170° C. for 2 hours, followed by heat treatment at 350° C. for 2 hours in a static air muffle furnace, and resulted in 6.20 g of reactivated catalyst. Sample 10 was dried at atmospheric pressure at 105° C. for 8 hours, followed by heat treatment at 350° C. for 2 hours in a static air muffle furnace, and resulted in 6.22 g of reactivated catalyst. The performance of the catalyst samples was evaluated and the results are tabulated in Table 3.

TABLE 3

| Sample # | Post-fluoridation Drying Procedure | Initial $T_{60}$ (° F.) | TOS (hr) | Final $T_{60}$ (° F.) | Fouling Rate (° F./$10^3$ hr) |
|---|---|---|---|---|---|
| 9 | vacuum drying | 931 | 92 | 936 | 64 |
| 10 | non-vacuum drying | 923 | 162 | 923 | Not observed |

The results demonstrate that Sample 10 where the Post-F drying was carried out at ambient pressure resulted in the better performance of the resulting rejuvenated catalyst as fouling was not observed over the time period tested.

Example 4

The effect of varying the fluoride concentration during the reactivation of spent catalyst samples on the performance of the reactivated catalysts was investigated. TMAF was used as the fluorine-containing compound. The amount typically employed during the preparation of fresh aromatization catalysts is about 1 wt %.

Three spent catalyst samples, designated Samples 11-13, were decoked by exposure to an oxygen/nitrogen mixture flowing at 400 ml/min at 525° C. for 2 hours. The samples were oxychlorinated and fluoridated as described in Example 2. The three samples (6.3 g each) were impregnated with 2.8 g, 4.2 g, and 5.50 g respectively of a TMAF containing 21.8 g of TMAOH, 5 g of 48 wt % HF solution, and 73.7 g of water. The samples were left under ambient conditions for 4 hours, dried, and heat treated as described in Example 1. The performance of the catalyst samples was evaluated and the results are tabulated in Table 4.

TABLE 4

| Sample # | F (wt %) | Temp ° C. Post-F | Initial $T_{60}$ (° F.) | TOS (hr) | Final $T_{60}$ (° F.) | Fouling Rate (mF/hr) |
|---|---|---|---|---|---|---|
| 11 | 1.02 | 350 | 915 | 115 | 916 | 10 |
| 12 | 1.53 | 350 | 918 | 115 | 930 | 104 |
| 13 | 1.99 | 350 | 922 | 67 | 916 | Not observed |

Referring to Table 4, the results suggest that a higher concentration of fluoride (Sample 13) provides a better fouling rate since no fouling was observed under these conditions.

Example 5

The effect of various fluorine-containing compounds used during the reactivation of spent catalyst samples on the performance of the reactivated catalysts was investigated. Samples of spent aromatization catalyst were obtained as described previously and designated Samples 14-17. These samples were subjected to a reactivation process as described in Example 1 by decoking at 525° C. for 2 hours followed by oxychlorination at 525° C. for 4 hours. A mixed gas of HCl/

$H_2O/O_2/N_2$ in a molar ratio of about 1:3:8:88 was used during the oxychlorination step. In Samples 14-16, 6.3 g of the oxychlorinated catalyst samples were impregnated with a 3.0 g of a halogenating composition to produce an impregnated catalyst. The fluorine-containing compound in the halogenating composition was varied for each sample and the composition for each sample is presented in Table 5.

TABLE 5

| Sample # | Fluorine-containing compounds |
|---|---|
| B | TMAF: 21.8 g of TMAOH 5 g of 48 wt % HF solution, and 73.7 g of water |

TABLE 5-continued

| Sample # | Fluorine-containing compounds |
|---|---|
| C | Pure HF: 2.4 wt % HF solution |
| D | Commercially available TMAF solution: 2.8 g of a 20 wt % TMAF solution |
| E | Pure HF: 2.8 g of a 4.5 wt % HF solution |

The impregnated catalyst samples sat at ambient conditions for 2 hours, were dried at 105° C. and ambient pressure for 2 hours, and then heat treated at 375° C. for 2 hours in a static air muffle furnace. The resulting reactivated catalyst samples were weighted at 6.34 g, 6.39 g, 6.28 g, and 6.25 g respectively. The performance of the catalyst samples was evaluated and the results are tabulated in Table 6.

TABLE 6

| Sample # | F containing compound | F (wt %) | Initial $T_{60}$ (° F.) | TOS (hr) | Final $T_{60}$ (° F.) | Fouling Rate (mF/hr) |
|---|---|---|---|---|---|---|
| 14 | TMAF | 1.08 | 915 | 212 | 925 | 47 |
| 15 | HF | 1.07 | 981 | n/a | n/a | n/a |
| 16 | TMAF | 1.03 | 919 | 91 | 932 | 65 |
| 17 | AF | 1.04 | 954 | 20 | 994 | n/a |

Referring to Table 6, catalyst compositions reactivated using TMAF as the fluorine-containing compound produced the best results as these catalyst compositions displayed initial $T_{60}$ values lower than that of the catalyst samples reactivated using the other fluorine-containing compounds (i.e., HF, AF) evaluated.

Example 6

The effect of using either static or flowing gas after final heat treatment during the reactivation of spent catalyst samples on the performance of the reactivated catalysts was investigated. Five samples were prepared and designated Samples 18-22. These samples were decoked by exposure to a flowing mixture of oxygen and nitrogen at 500 ml/min for 6 hours at 538° C. with a ramp rate of 1° C./minute. The samples were then oxychlorinated by heat treatment at 525° C. in a flowing mixture of air/$N_2$/HCl at 500 ml/min for 6 hours. The temperature was then reduced from 525° C. to 265° C. and the HCl was removed. At this point, Sample 18 with no fluoridation was used without further processing while Samples 19-22 were fluoridated by impregnation with 10 g of a TMAF composition containing 44 g of 25 wt TMAOH, 5 g of 48 wt % HF solution, and 51 g of water. Samples 19-22 then sat at ambient conditions for varying time periods before being heat treated at 375° C. for 2 hours in a static air muffle furnace at varying gas mixtures and flow conditions. The reactivated catalyst samples were then reacted and the catalyst fouling rates were determined as described previously. The performance of the catalyst samples was evaluated and the results are tabulated in Table 7.

TABLE 7

| Sample # | F-containing compound | Fluorided Calcination | Diluent $N_2$/air | Initial $T_{60}$ (° F.) | TOS (hr) | Final $T_{60}$ (° F.) | Fouling (F/day) |
|---|---|---|---|---|---|---|---|
| 18 | n/a | n/a | n/a | 915 | 42 | 929 | 8.121 |
| 19 | TMAF | static | 0 | 915 | 211 | 915 | 0.066 |
| 20 | TMAF | flow | 0 | 918 | 91 | 914 | Not observed |
| 21 | TMAF | flow | 3 | 915 | 257 | 907 | Not observed |
| 22 | AF | flow | 0 | 964 | 21 | 979 | 18.159 |

Referring to Table 7, Sample 18 which was not treated with fluorine resulted in a catalyst composition which displayed a high fouling rate. Samples 19-21 which were treated with fluorine displayed a low fouling rate. Finally, treatment with AF (Sample 22) resulted in a catalyst composition which displayed a high fouling rate.

Example 7

The effect of using TFE as the fluorine-containing compound for the fluoridation step during the reactivation of spent catalyst samples on the performance of the reactivated catalysts was investigated. Three samples were prepared and designated Samples 23-25. The decoking and oxychlorination of the catalyst samples was carried out as described in Example 6. For the fluoridation step, 10 g of each catalyst sample was impregnated with 0.18 g of TFE at ambient conditions for 2 hours. Then, the catalyst samples, 10.5 g of Sample 23, 10.1 g of Sample 24, and 10.1 g of Sample 25 were heat treated for one hour in a static air muffle furnace at 400° C., 450° C., and 500° C. respectively. The performance of the catalyst samples was evaluated and the results are tabulated in Table 8.

TABLE 8

| Sample # | Post Fluoridation | Calcination Temp (C.) | Initial $T_{60}$ (F.) | TOS (hr) | Final $T_{60}$ (F.) | Fouling (F/day) |
|---|---|---|---|---|---|---|
| 23 | TFE | 400 | 1000 | n/a | n/a | n/a |
| 24 | TFE | 450 | 942 | 19 | 943 | 2.314 |
| 25 | TFE | 500 | 927 | 68 | 931 | 1.246 |

Referring to Table 8, the fouling rate using TFE as the fluorine-containing compound was comparable to that obtained using other compounds. However, the run had to be carried out at a higher temperature to obtain comparable fouling rates.

Example 8

The use of EDA during the reactivation of spent catalyst samples on the performance of the reactivated catalysts was investigated. As will be understood by one of ordinary skill in the art with the aids of this disclosure, following impregnation with a reactivating composition the catalyst composition may comprise some amount of free acid. EDA is a weak base that can extract free acid out of the catalyst. The spent catalyst samples were decoked by exposure to a flowing oxygen/nitrogen mixture at a 500 cc/hr for 2 hours at 500° C. Then the oxychlorination was performed by exposure to a flowing air/N$_2$ mixture at 100 ml/min which had been bubbled through a 37 wt % HCl solution at 525° C. for 2 hours before the temperature was reduced to 350° C., then HCl was removed, and the exposure was continued for another 2 hours. The fluoridation was carried out by obtaining 2 portions, designated Samples 25 and 26, where each sample was weighted at 7.45 g. Sample 26 was prepared without EDA by impregnation with 3.30 g of a halogenating composition containing 60 g of 25 wt % TMAOH solution, 4 g of 37 wt % HCl solution, 5 g of 48 wt % HF solution, and 31 g water. Sample 27 was prepared with EDA by using the halogenating composition described above with the addition of 0.50 g of 10 wt % EDA solution. Both samples then sat at ambient conditions for 64 hours, dried at 170° C. for 2 hours in a vacuum oven and heat treated at 350° C. for 2 hours in a static air muffle furnace. In both samples, the amount of reactivated catalyst recovered was 7.33 g. The performance of the catalyst samples was evaluated and the results are tabulated in Table 9. Referring to Table 9, the results demonstrate that adding EDA during fluoridation improved the fouling rate.

TABLE 9

| Sample | EDA additives | Initial T$_{60}$ (° F.) | TOS (hr) | Final T$_{60}$ (F.) | Fouling (F./hr) |
|---|---|---|---|---|---|
| 26 | none | 955 | 120 | 982 | 0.21 |
| 27 | 0.5 g 10% EDA | 920 | 169 | 956 | 0.18 |

Example 9

The performance of catalyst samples after each step in the reactivation process was investigated. Three samples of spent catalyst, each weighted at 25 g, were decoked by slowly heating them to 500° C. over a period of 7 hours in the presence of flowing air at 250 ml/min and then held at 500° C. for 2 hours. One of the samples, designated Sample 28, was ready at this point and isolated for performance testing.

The remaining samples were subjected to an oxychlorination process which comprised exposure to a flowing oxygen/nitrogen mixture at 200 ml/min at 525° C. Once the temperature reached 525° C., HCl was introduced at a molar ratio of about 1:3:8:88 for HCl:H$_2$O:O$_2$:N$_2$. After 4 hours, the HCl and air was removed and the temperature was reduced to 350° C. and held for 3 more hours. One of the samples, designated Sample 29 and weighted at 24.81 g, was isolated at this point for performance testing.

The remaining sample, designated Sample 30, was subjected to a chlorofluorination process by impregnating 6.2 g of the catalyst sample with 2.80 g of a halogenating composition containing 60 g of 25 wt % TMAOH solution, 4 g of 37 wt % HCl solution, 5 g of 48 wt % HF solution, and 31 g of water. Sample 30 was then sat at ambient conditions for 20 hours, dried at 105° C. for 8 hours, and heat treated at 350° C. for 2 hours in a static air muffle furnace to produce 6.16 g of material. The performance of the catalyst samples was evaluated and the results are tabulated in Table 10.

TABLE 10

| Sample # | Decoking | Oxychlorination | TMAF/ TMAC | Initial T$_{60}$ (° F.) | TOS (hr) | Final T$_{60}$ (F.) | Fouling (F/10$^3$ hr) |
|---|---|---|---|---|---|---|---|
| 28 | 500° C., 2 hrs | n/a | n/a | >1000 | n/a | n/a | n/a |
| 29 | 500° C., 2 hrs | 525° C., 4 hrs | n/a | 926 | 164 | 976 | 320 |
| 30 | 500° C., 2 hrs | 525° C., 4 hrs | F, Cl | 911 | 1028 | 955 | 38 |

The results demonstrate that the use of chloride resulted in a lower fouling rate as observed for Sample 30.

Example 10

The effect of using HF in the gas phase as the fluorine-containing compound during the reactivation of spent aromatization catalyst samples on the performance of the reactivated catalysts was investigated. A sample of spent aromatization catalyst, designated Sample 31, was subjected to decoking and oxychlorination as described in Example 6. The fluoridation process was carried out by passing a nitrogen stream through a bubbler containing a 48 wt % HF solution for an hour. Another sample of spent aromatization catalyst, designated Sample 32, was subject to fluoridation process at 300° C. for 2 hours. The performance of Samples 31 and 32 were evaluated and compared to the result obtained for Sample 18. These results are presented in Table 11.

TABLE 11

| Sample # | Fluoridation Procedure | Temperature (° C.) | Time (hr) | Initial T$_{60}$ (° F.) | TOS (hr) | Final T$_{60}$ (F.) | Fouling (F/day) |
|---|---|---|---|---|---|---|---|
| 18 | None | n/a | n/a | 915 | 42 | 929 | 8.121 |
| 31 | Gas Phase | 375 | 1 | 913 | 306 | 915 | 0.089 |
| 32 | Gas Phase | 300 | 2 | 944 | 19 | 940 | Not observed |

Referring to Table 11, the results demonstrate that the use of a gas phase fluorine-containing compound resulted in lower fouling rates when compared to samples prepared using a liquid phase fluorine-containing compound. Additionally, the calcination temperature affects the fouling rate, as shown above in Sample 31 that was calcined at 375° C. instead of 300° C. resulted in lower fouling rate.

Example 11

The effect of in-situ gas phase fluoridation in contrast to ex-situ gas phase fluoridation (as described in Example 10) on the reactivation process was investigated. The decoking process was performed on 50 g of spent aromatization catalyst samples by exposure to a flowing air/$N_2$ mixture at 500 ml/min with 1° C./min ramp rate for 6 hours at 538° C. The catalyst samples (Samples 33-38) were oxychlorinated by exposure to a flowing air/$N_2$/HCl at of 500 ml/min for 7.5 hours at 520° C. The catalyst samples were cooled and the HCl removed. Sample 33 was not subjected to fluoridation. Samples 34-38 were fluoridated by exposure to a flowing air/$N_2$ mixture at varying temperatures as indicated in Table 12. The fluorine was introduced by passing the gas mixture through a bubbler containing a 48 wt % HF solution for an hour. The amount of reactivated catalyst samples recovered were 5.02 g, 4.98 g, 5.01 g, 5.00 g, and 5.48 g for samples designated Samples 34 to 38 respectively. The performance of the catalyst samples was evaluated and the results are tabulated in Table 12.

TABLE 12

| Sample # | Fluoridation Temperature (° C.) | Initial $T_{60}$ (° F.) | TOS (hr) | Final $T_{60}$ (° F.) |
|---|---|---|---|---|
| 33 | None | 919 | 20 | 939 |
| 34 | 325 | 913 | 19 | 908 |
| 35 | 300 | 909 | 20 | 904 |
| 36 | 275 | 911 | 19 | 902 |
| 37 | 250 | 904 | 20 | 893 |
| 38 | 225 | 911 | 18 | 915 |

The results demonstrate that the fluoridation temperatures listed in Table 12 did not provide any additional advantage in terms of improvement in catalyst performance.

Example 12

The effect of substituting TMAF for $NH_4F$ in the final fluoridation step in the reactivation of spent catalyst was investigated. Four samples, designated Samples 55-58, were processed as described in Example 24 with the exception that $NH_4F$ was used in the halogenating composition. The oxychlorination was carried out at 525° C. for 4 hours by passing 37% HCl through an air bubbler. The performance of the catalyst samples was evaluated and the results are tabulated in Table 13. The results demonstrate the use of TMAF in Samples 56 and 57 resulted in lower fouling rates compared to $NH_4F$ and $NH_4F$—$NH_4Cl$.

TABLE 13

| Sample # | F-containing compounds | Initial $T_{60}$ (F.) | TOS (hr) | Final $T_{60}$ (F.) | Fouling rate (F./day) |
|---|---|---|---|---|---|
| 55 | $NH_4F$ | 958 | 140 | 978 | 3.522 |
| 56 | TMAF | 937 | 234 | 930 | Not observed |
| 57 | TMAF | 912 | 1437 | 981 | 1.159 |
| 58 | $NH_4F$—$NH_4Cl$ | 946 | 163 | 977 | 5.041 |

Example 13

The effect of the reactivation methodology on the fouling rates of two different spent catalysts was investigated. Sample 59 was a spent aromatization catalyst, designated catalyst I, and was used without further processing. A portion of this catalyst was subjected to a heat treatment using air/$N_2$ mixture at 1:1 mol ratio to remove coke deposits and designated Sample 60. A portion of Sample 60 was then treated to redistribute the Pt within the KL zeolite via oxychlorination methods as described in Example 1 using a mixed gas of HCl/$H_2O$/$O_2$/$N_2$ at about 1:3:8:88 mole ratio. The sample was then subjected to a fluoridation process which involved impregnating TMAF. The mixture was then dried for several hours; heat treated at a temperature of 375° C., and designated Sample 61.

Additionally, another type of spent catalyst, designated catalyst II, was separated into two portions designated Samples 62 and 63. Sample 63 was used without further processing while Sample 63 was subjected to the same reactivation process as described for Sample 61. The performance of the catalyst samples was evaluated and the results are tabulated in Table 14.

TABLE 14

| Sample # | Catalyst | Initial $T_{60}$ (F.) | TOS (hr) | Final $T_{60}$ (F.) |
|---|---|---|---|---|
| 59 | Spent Catalyst I | 916 | 20 | 921 |
| 60 | Decoked, spent Catalyst I | 991 | n/a | n/a |
| 61 | reactivated, decoked, spent Catalyst I | 915 | 211 | 915 |
| 62 | Spent Catalyst II | 992 | n/a | n/a |
| 63 | reactivated Spent Catalyst II | 916 | 1434 | 984 |

Example 14

The effect of the time period of oxychlorination and the chlorine concentration on the catalyst reactivation process was investigated. Seven spent aromatization catalyst samples were prepared and designated Samples 64-70. The samples were reactivated as described previously herein and the time periods for oxychlorination along with the chlorine concentration were varied as shown in Table 15. The performance of the catalyst samples was evaluated and the results are tabulated in Table 15. The results demonstrate that the oxychlorination period can be shortened by $\frac{1}{6}^{th}$ of its original period to produce comparable fouling rate.

TABLE 15

| Sample # | Oxychlorination | | SOR $T_{60}$ (F.) | TOS (hr) | EOR $T_{60}$ (F.) | Fouling mF/hr |
|---|---|---|---|---|---|---|
| | GHSV | Hr | | | | |
| 64 | 3000 | 1 | 919 | 138 | 934 | 117.4 |
| 65 | 1500 | 1 | 923 | 138 | 932 | 37.2 |
| 66 | 1500 | 2 | 926 | 163 | 940 | 39.2 |
| 67 | 1500 | 1 | 923 | 162 | 932 | 35.9 |
| 68 | 1500 | 1 | 923 | 477 | 961 | 67.4 |
| 69 | 750 | 6 | 927 | 474 | 955 | 55.1 |
| 70 | 750 | 1 | 934 | 19 | 943 | n/a |

Example 15

The effect of reactivating the catalyst in a one-step method was investigated. Three spent aromatization catalyst samples designated Samples 71-73 were prepared. The previously separate steps in reactivation of spent catalyst are calcination, oxychlorination, gas phase fluoridation, drying, and calcination. These steps were replaced with a one step reactivation method involving calcination on a temperature ramping stage, followed by a short oxychlorination, and finally gas phase fluoridation in the cooling stage. The performance of the catalyst samples was evaluated and the results are tabulated in Table 16. The results demonstrate that as the Gas Hourly Space Velocity (GHSV) increased, more fluorine was added, and a higher catalyst performance was observed (Sample 72) as shown by a decrease in fouling rate. However, as shown in sample 73, when the fluorine concentration was higher than 2% a decrease in the catalyst performance was observed resulting in increased fouling rate.

TABLE 16

| Sample # | Gas Phase Fluoridation GHSV | Gas Phase Fluoridation Hr | Calculated wt % F. | SOR $T_{60}$ (F.) | TOS (hr) | EOR $T_{60}$ (F.) | Fouling mF/hr |
|---|---|---|---|---|---|---|---|
| 71 | 450 | 1 | 0.698 | 918 | 44 | 938 | 474.6 |
| 72 | 750 | 1 | 1.163 | 913 | 403 | 939 | 52.5 |
| 73 | 1500 | 1 | 2.326 | 944 | 68 | 957 | 231.1 |

Example 16

The effect of the chlorine-containing compound on the catalyst reactivation process was investigated. In previous examples, HCl was bubbled through a water bubbler to generate the chlorine-containing compound used in the oxychlorination step. HCl is a highly corrosive material and methods of producing HCl in-situ using $CCl_4$ or the less toxic tetrachloroethylene ($Cl_2C=CCl_2$) were investigated.

Three samples designated Samples 74-76 were prepared as described previously herein with the exception that $CCl_4$ was substituted for HCl during the oxychlorination process. The performance of the catalyst samples was evaluated and the results are tabulated in Table 17. The results demonstrate that use of $CCl_4$ resulted in a catalyst having a fouling rate comparable to that observed when HCl was employed.

TABLE 17

| Sample # | Molar $H_2O/CCl_4$ | GHSV $Hr^{-1}$ | Wt % Cl Hourly | Wt % Cl Total | Atomic Cl/Pt | SOR $T_{60}$ (F.) | TOS Hr | EOR $T_{60}$ (F.) | Fouling mF/hr |
|---|---|---|---|---|---|---|---|---|---|
| 74 | 9 | 414 | 1.01 | 5.54 | 30.42 | 907 | 163 | 909 | 9.6 |
| 75 | 10 | 1480 | 3.60 | 5.40 | 29.67 | 885 | 403 | 888 | 4.3 |
| 76 | 16 | 1480 | 3.60 | 5.40 | 29.67 | 910 | 92 | 910 | Not observed |

Samples 77-79 were prepared as described previously herein with the exception that $Cl_2$ was substituted for HCl during the oxychlorination process. The performance of the catalyst samples was evaluated and the results are tabulated in Table 18. The results demonstrate that $Cl_2$ gas resulted in a fouling similar to that of HCl.

TABLE 18

| Sample # | Cl-containing compound | F-containing compound | Initial $T_{60}$ int (F.) | TOS (hr) | Final $T_{60}$ int (F.) | Fouling (mF/hr) |
|---|---|---|---|---|---|---|
| 77 | n/a | n/a | 916 | 162 | 924 | 39.8 |
| 78 | $CCl_4$ | $F_2$ | 918 | 330 | 914 | 14.8 |
| 79 | $Cl_2$ | $F_2$ | 911 | 330 | 919 | 20.9 |

Samples 80-82 were prepared as described previously herein with the exception that $NH_4Cl$ was substituted for HCl during the oxychlorination process. The performance of the catalyst samples was evaluated and the results are tabulated in Table 19. The results demonstrate that the fouling rates from the procedure with $NH_4Cl$ and $NH_4F$ are comparable to the fouling rates of catalysts prepared using HCl.

TABLE 19

| Sample # | Cl-containing compound | Carrier | F-containing compound | SOR $T_{60}$ (F.) | TOS (hr) | EOR $T_{60}$ (F.) | Fouling mF/hr |
|---|---|---|---|---|---|---|---|
| 80 | n/a | n/a | n/a | 898 | 115 | 903 | 45.4 |
| 81 | NH4Cl | Dry air | NH4F | 933 | 91 | 930 | Not observed |
| 82 | NH4Cl | Wet air | NH4F | 912 | 140 | 915 | 11.6 |

Figure 2:
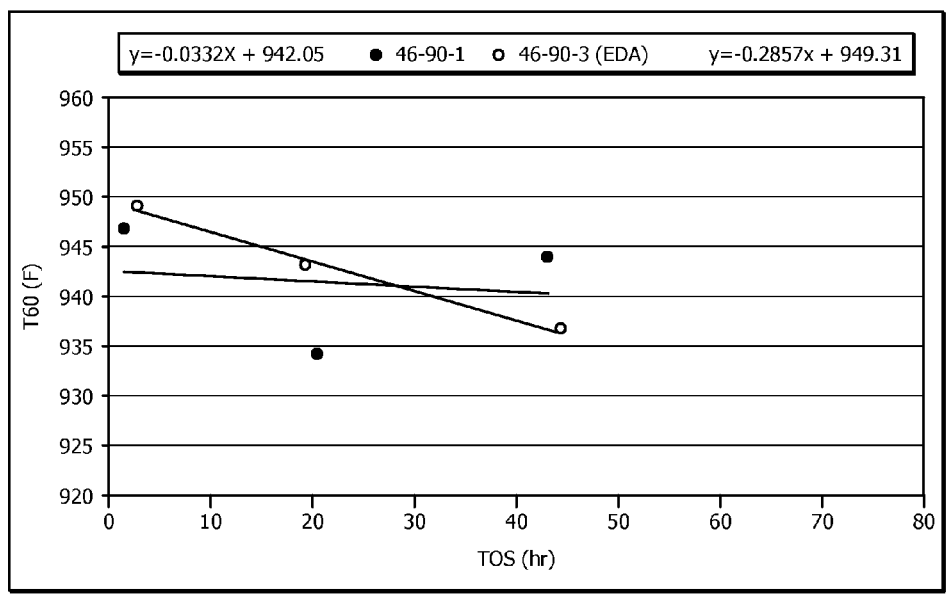
FIG. 2 is a graph illustrating the relationship between time on stream and adjusted $T_{60}$ internal for the samples from Example 16.

The adjust $T_{60}$ internal was also plotted against TOS in FIG. 2.

Example 17

The reactivation of spent catalyst samples was carried out by decoking five samples, designated Samples 83-87, and then exposing the samples to HF at 250° C. with either hydrogen or air followed by a second treatment with HF at 500° C. in a hydrogen carrier gas. The performance of the catalyst samples was evaluated and the results are tabulated in Table 20.

TABLE 20

| Sample # | 250° C. HF Carrier Gas | 500° C. HF Carrier Gas | Initial $T_{60}$ (F.) | TOS (hr) | Final $T_{60}$ (F.) | Fouling (mF/hr) |
|---|---|---|---|---|---|---|
| 83 | Air | n/a | 917 | 330 | 022 | 17.4 |
| 84 | Air | H2 | 918 | 332 | 017 | Not observed |
| 85 | H$_2$ | n/a | 919 | 139 | 932 | 100.3 |
| 86 | n/a | H2 | 927 | 139 | 936 | 84.4 |
| 87 | H$_2$ | H2 | 917 | 355 | 916 | Not observed |

Figure 3:
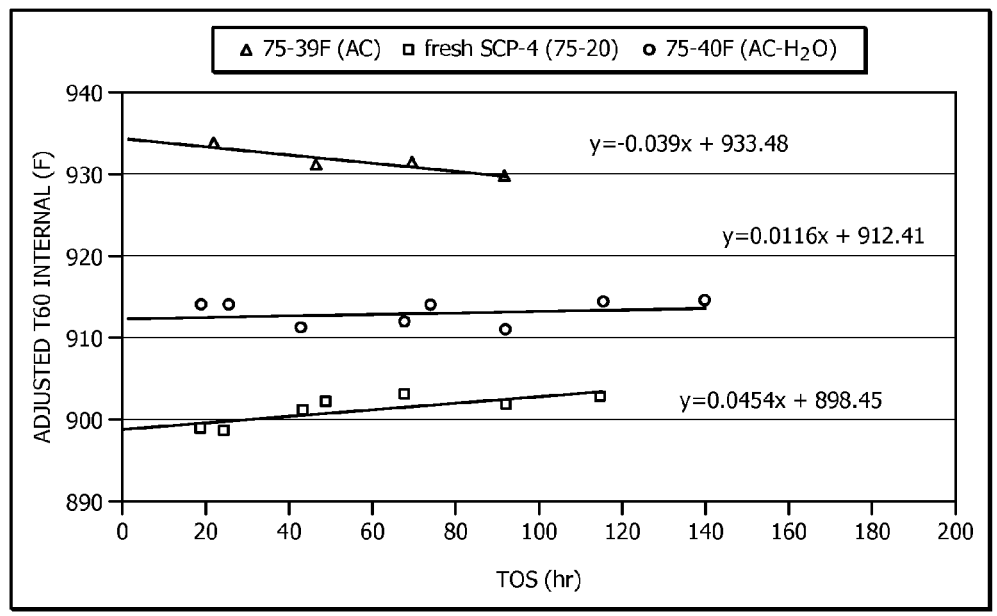
FIGS. 3-4 are graphs illustrating the relationship between time on stream and adjusted $T_{60}$ for the samples from Example 17.

The results demonstrate that for the reactivation of catalyst samples, an additional treatment of the sample with a fluoridating compositions comprising HF resulted in a decrease in fouling rates. Additionally, the second treatment can be done in-situ in the reactor and can replace the TMAF fluoridation step. The $T_{60}$ was also plotted again TOS for SCP-4 in FIG. 3.

Secondly, the use of fluorine gas $F_2$ was investigated and compared to the use of HF during the gas phase fluorination for the reactivation of spent catalyst. $F_2$ was considered as a candidate to replace HF since it has a lower toxicity and lower freezing point making the material easier to handle. The fouling rates of catalyst samples prepared using $F_2$ was compared to the fouling rates of fresh catalysts and catalysts reactivated using HF. The results are tabulated in Table 21.

TABLE 21

| Sample # | Catalyst | F-containing compound | Post Fluorination Carrier | Initial $T_{60}$ (F.) | TOS (hr) | Final $T_{60}$ (F.) | Fouling (mF/hr) |
|---|---|---|---|---|---|---|---|
| 88 | Fresh | n/a | n/a | 921 | 162 | 924 | 24.4 |
| 89 | Oxychlorination + [F] | HF | Air | 917 | 330 | 916 | 17.4 |
| 90 | Oxychlorination + [F] | $F_2$ | Air | 901 | 330 | 906 | 15.2 |
| 91 | fresh | n/a | n/a | 899 | 165 | 911 | 71.1 |
| 92 | spent | $F_2$ | Air | 911 | 331 | 918 | 6.4 |
| 93 | spent | $F_2$ | H$_2$ | 914 | 164 | 932 | 105.3 |
| 94 | spent | $F_2$ | N$_2$ | 905 | 140 | 919 | 44 |

Figure 4:
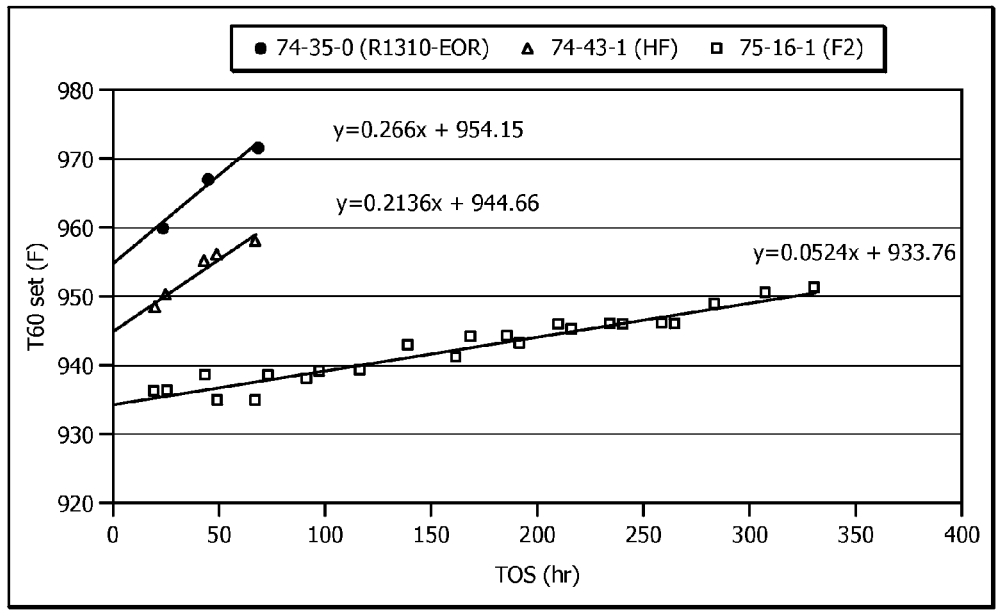

The carrier gas was varied and the effect of the carrier gas on the fouling rates demonstrated that the fouling rate increased as the carrier gas was changed from air to $N_2$, to $H_2$. The $T_{60set}$ was also plotted against the TOS for SCP-4 and this is shown in FIG. 4.

Example 18

The following experiments were conducted to investigate reactivating a spent aromatization catalyst by two fluoridation steps. The spent aromatization catalyst samples were decoked, oxychlorinated, and then fluoridated twice. The first two steps (i.e., decoking and oxychlorination) were carried out as described in Example 1. First, the effect of the nature of the fluorine-containing compound on the catalyst activity was investigated by comparing HF to $F_2$ and the results are tabulated in Table 22. The results demonstrate that using $F_2$ in the reactivating composition results in a catalyst having a reduced fouling rate when compared to a catalyst prepared using HF.

TABLE 22

| Sample # | Catalyst | F-containing compound | Post Fluorination Carrier | Initial $T_{60}$ (F.) | TOS (hr) | Final $T_{60}$ (F.) | Fouling (mF/hr) |
|---|---|---|---|---|---|---|---|
| 95 | spent | n/a | Air | 954 | 68 | 972 | 266 |
| 96 | spent | HF | Air | 945 | 67 | 958 | 214 |
| 97 | spent | $F_2$ | Air | 934 | 331 | 952 | 52.4 |

Figure 5:
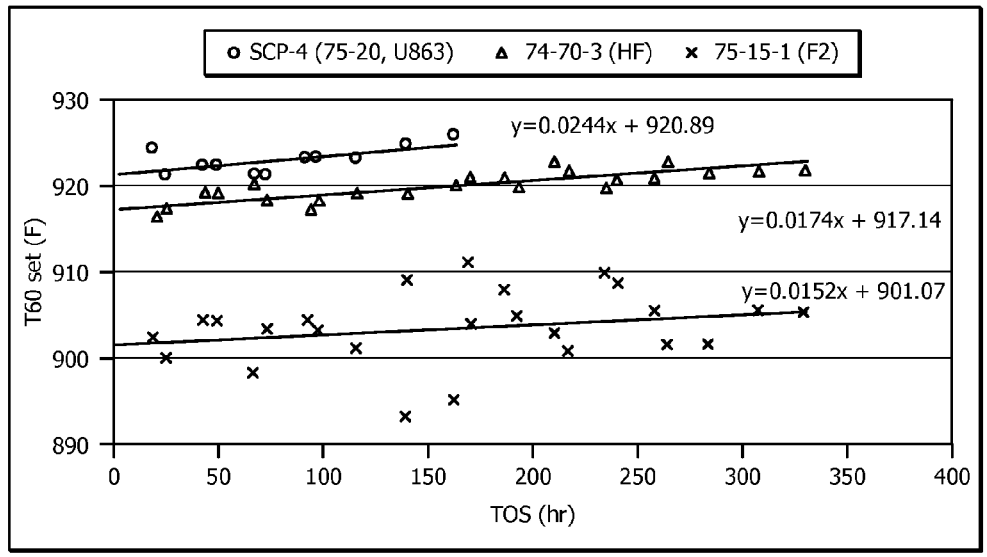
FIGS. 5-6 are graphs illustrating the relationship between time on stream and adjusted $T_{60}$ for the samples from Example 18.
Figure 6:
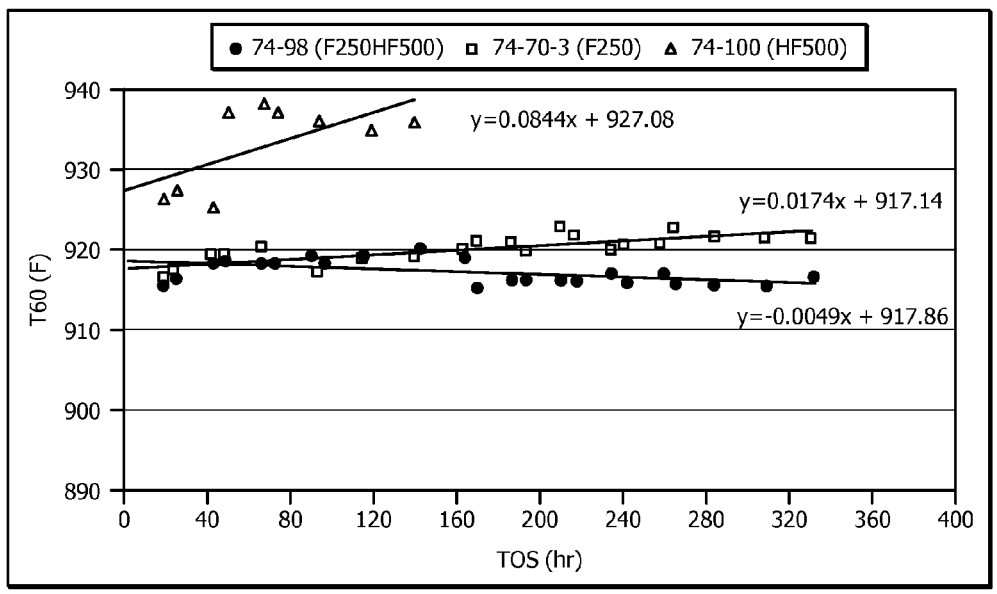

The $T_{60set}$ was plotted against the TOS for EOR SCP-4 catalyst in FIGS. 5-6.

Example 19

The reactivation of spent catalyst samples was carried out as described in Example 1 with the exception that the samples were then exposed to HF at 250° C. with either hydrogen or air followed by a second treatment with HF at 500° C. in a hydrogen carrier gas. The performance of the catalyst samples was evaluated and the results are tabulated in Table 23.

TABLE 23

| Sample # | 250° C. HF Carrier Gas | 500° C. HF Carrier Gas | Initial $T_{60}$ (F.) | TOS (hr) | Final $T_{60}$ (F.) | Fouling (mF/hr) |
|---|---|---|---|---|---|---|
| 98 | Air | n/a | 917 | 330 | 022 | 17.4 |
| 99 | Air | H2 | 918 | 332 | 017 | Not observed |
| 100 | H₂ | n/a | 919 | 139 | 932 | 100.3 |

TABLE 23-continued

| Sample # | 250° C. HF Carrier Gas | 500° C. HF Carrier Gas | Initial $T_{60}$ (F.) | TOS (hr) | Final $T_{60}$ (F.) | Fouling (mF/hr) |
|---|---|---|---|---|---|---|
| 101 | n/a | H2 | 927 | 139 | 936 | 84.4 |
| 102 | H₂ | H2 | 917 | 355 | 916 | Not observed |

The results demonstrate that for the reactivation of catalyst samples, an additional treatment of the sample with a fluoridating composition comprising HF resulted in a decrease in fouling rates. Additionally, the second treatment can be done in-situ in the reactor and can replace the TMAF fluoridation step. The $T_{60set}$ was also plotted again TOS for SCP-4 EOR R 1360 reactivation (U863) in FIGS. 2-3.

Secondly, the use of fluorine gas $F_2$ was investigated and compared to the use of HF during the gas phase fluoridation for the reactivation of spent catalyst. $F_2$ was considered as a candidate to replace HF since it has a lower toxicity and lower freezing point making the material easier to handle. The fouling rates of catalyst samples prepared using $F_2$ was compared to the fouling rates of fresh catalysts and catalysts reactivated using HF. The results are tabulated in Table 24.

TABLE 24

| Sample # | Catalyst | F-containing compound | Post Fluorination Carrier | Initial $T_{60}$ (F.) | TOS (hr) | Final $T_{60}$ (F.) | Fouling (mF/hr) |
|---|---|---|---|---|---|---|---|
| 103 | Fresh | n/a | ? | 921 | 162 | 924 | 24.4 |
| 104 | Oxychlorination + [F] | HF | Air | 917 | 330 | 916 | 17.4 |
| 105 | Oxychlorination + [F] | $F_2$ | Air | 901 | 330 | 906 | 15.2 |
| 106 | fresh | n/a | n/a | 899 | 165 | 911 | 71.1 |
| 107 | spent | $F_2$ | Air | 911 | 331 | 918 | 6.4 |
| 108 | spent | $F_2$ | H₂ | 914 | 164 | 932 | 105.3 |
| 109 | spent | $F_2$ | N₂ | 905 | 140 | 919 | 44 |

The carrier gas was varied and the effect of the carrier gas on the fouling rates demonstrated that the fouling rate increased as the carrier gas was changed from air to $N_2$, to $H_2$. The $T_{60set}$ was also plotted against the TOS for reactivating of spent aromatization catalyst and this is shown in FIG. 6.

Example 20

The following experiments were conducted to investigate reactivating a spent aromatization catalyst by a two step process comprising decoking following by fluoridation. First, the effect of the nature of the fluorine-containing compound on the catalyst activity was investigated by comparing HF to $F_2$ and the results are tabulated in Table 25. The results demonstrate that using $F_2$ in the reactivating composition results in a catalyst having a reduced fouling rate when compared to a catalyst prepared using HF.

TABLE 25

| Sample # | Catalyst | F-containing compound | Post Fluorination Carrier | Initial $T_{60}$ (F.) | TOS (hr) | Final $T_{60}$ (F.) | Fouling (mF/hr) |
|---|---|---|---|---|---|---|---|
| 110 | spent | n/a | Air | 954 | 68 | 972 | 266 |
| 111 | spent | HF | Air | 945 | 67 | 958 | 214 |
| 112 | spent | $F_2$ | Air | 934 | 331 | 952 | 52.4 |

Figure 7:
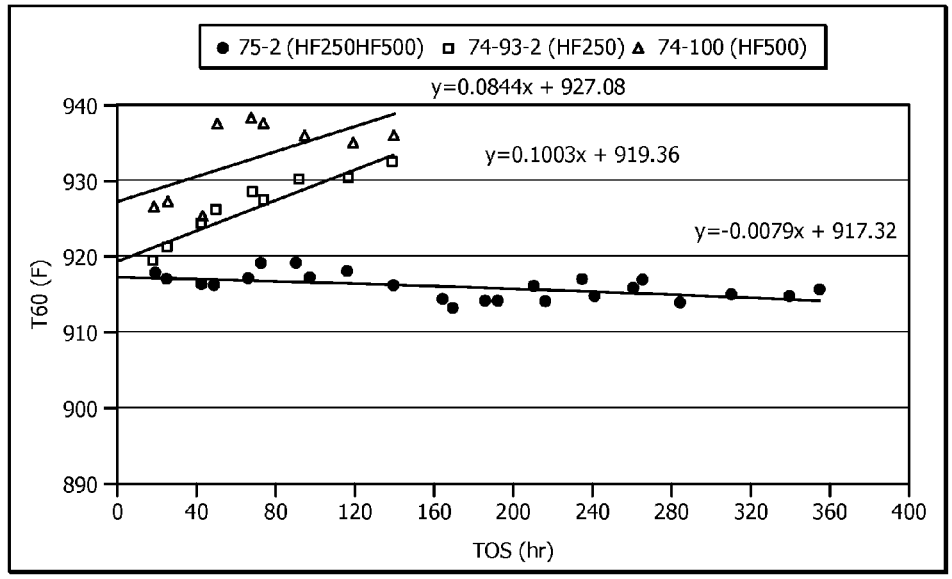
FIG. 7 is a graph illustrating the relationship between time on stream and adjusted $T_{60}$ for the samples from Example 20.

The $T_{60set}$ was plotted against the TOS for reactivated EOR SCP-4 catalyst in FIG. 7.

Example 21

Reactivation of a spent aromatization catalyst using a non-oxidative procedure was investigated. The spent catalyst was reactivated as described in Example 1 with the exception that a high temperature hydrogen pretreatment step was carried out prior to $F_2$ fluoridation. The performance of the catalyst samples was evaluated and these results are tabulated in Table 26.

TABLE 26

| Sample # | Pretreatment Gas/Temp C. | F-containing compound/Temp C. | Initial $T_{60}$ (F.) | TOS (hr) | Final $T_{60}$ internal (F.) | Fouling (mF/hr) |
|---|---|---|---|---|---|---|
| 113 | n/a | n/a | 949 | 90 | 967 | 217.5 |
| 114 | $H_2$/500 | $H_2/F_2$/500 | 948 | 331 | 964 | 45.9 |
| 115 | $H_2$/525 | $H_2/F_2$/400 | 947 | 332 | 958 | 35.4 |
| 116 | n/a | $H_2/F_2$/400 | 952 | 235 | 964 | 50.4 |

Example 22

In this example, reactivation of a spent catalyst using an oxidative pretreatment followed by fluoridation with $F_2$ gas was investigated. The temperature at which each step was carried out was varied as indicated in Table 27. The performance of the catalyst samples was evaluated and the results are tabulated in Table 27.

TABLE 27

| Sample # | Pretreatment Gas/Temp C. | F-containing compound/Temp C. | Calculated wt % F Added | Initial $T_{60}$ (F.) | TOS (hr) | Final $T_{60}$ internal (F.) | Fouling (mF/hr) |
|---|---|---|---|---|---|---|---|
| 117 | n/a | none | 0.0 | 949 | 90 | 967 | 217.5 |
| 118 | Air/400 | None | 0.0 | 952 | 163 | 973 | 134.9 |
| 119 | Air/250 | Air/$F_2$/250 | 1.0 | 942 | 331 | 962 | 55.8 |
| 120 | Air/400 | Air/$F_2$/400 | 1.0 | 945 | 164 | 953 | 49.1 |
| 121 | Air/400 | Air/$F_2$/400 | 2.0 | 960 | 234 | 974 | 56.6 |
| 122 | Air/400 | Air/$F_2$/400 | 2.0 | 943 | 91 | 947 | 68.9 |

Figure 8:
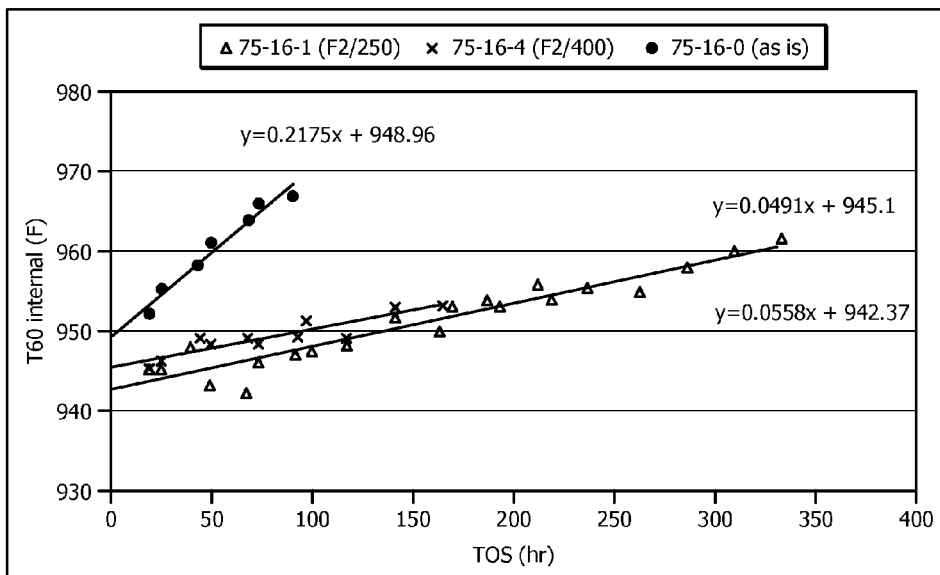
FIGS. 8-9 are graphs illustrating the relationship between time on stream and adjusted $T_{60}$ for the samples from Example 21.
Figure 9:
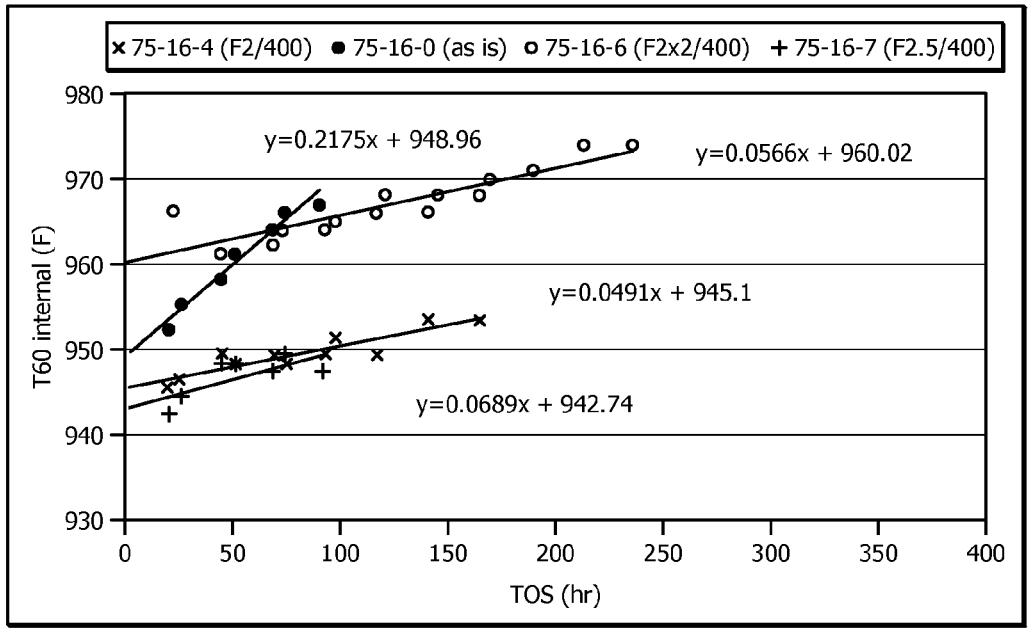

Additionally the $T_{60set}$ internal was plotted against TOS as shown in FIGS. 8-9.

Example 23

Reactivation of a spent catalyst, using $CCl_4$ during oxychlorination was investigated and compared to the use of $Cl_2$ as the chlorine-containing compound. The spent catalysts were reactivated as described in Example 1 with the exception that $CCl_4$ was used as the chlorine-containing compound. The use of $CCl_4$ will reduce exothermic condition particularly in a fixed bed reactor during oxychlorination. Various fluorine-containing compounds were utilized in the reactivation of the catalysts. The total reactivated catalysts were tested on bench units and the results are tabulated in Table 28.

TABLE 28

| | Post Fluoridation | | SOR $T_{60}$ | | EOR $T_{60}$ | |
|---|---|---|---|---|---|---|
| Sample # | F-Containing compounds | Phase | internal (F.) | TOS (hr) | internal (F.) | Fouling (F/day) |
| 123 | n/a | n/a | 899 | 165 | 911 | 71.1 |
| 124 | TMAF | Liquid | 911 | 140 | 916 | 38.3 |
| 125 | $F_2$ | Gas | 912 | 330 | 919 | 23.4 |

TABLE 28-continued

| | Post Fluoridation | | SOR $T_{60}$ | | EOR $T_{60}$ | |
|---|---|---|---|---|---|---|
| Sample # | F-Containing compounds | Phase | internal (F.) | TOS (hr) | internal (F.) | Fouling (F/day) |
| 126 | NH4F | Solid | 916 | 140 | 919 | 27.9 |
| 127 | HF | Gas | 924 | 67 | 944 | 309.8 |

Figure 10:
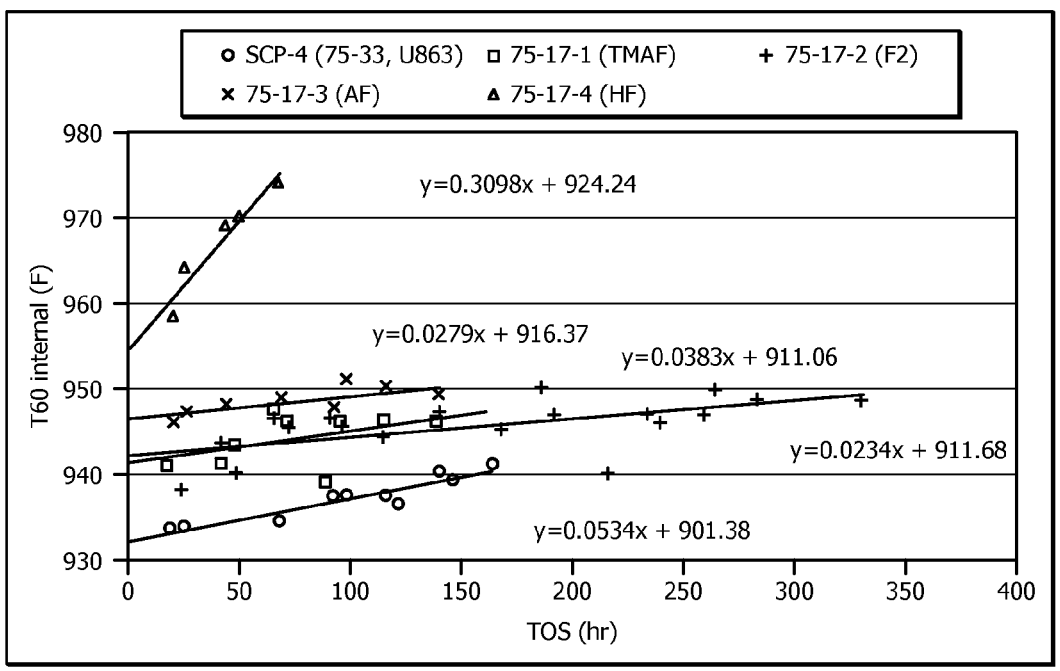
FIG. 10 is a graph illustrating the relationship between time on stream and adjusted $T_{60}$ for the samples from Example 22.

The results demonstrate that the fouling rate from best to worst are $(CH_3)_4NF$ (liquid-phase)~$F_2$ (gas phase)~$NH_4F$ (gas phase)>>HF (gas phase). The $T_{60set}$ internal was also plotted against TOS in FIG. 10.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A method of reactivating a spent catalyst comprising a metal and a catalyst support, the method comprising:
    (a) recovering the spent catalyst from a reactor;
    (b) redispersing the metal in the spent catalyst to produce a redispersed spent catalyst by contacting the spent catalyst with a redispersing composition comprising $O_2$ and a chlorine-containing compound at a temperature of at least 100° C.;
    (c) contacting the redispersed spent catalyst with a reactivating composition to produce a redispersed, reactivated spent catalyst; and
    (d) thermally treating the redispersed, reactivated spent catalyst to produce a reactivated catalyst.

2. The method of claim 1 wherein the catalyst support comprises medium pore zeolites, large pore zeolites, amorphous inorganic oxides, or combinations thereof.

3. The method of claim 1 wherein the metal comprises a Group IB element, Group VIII element, or combinations thereof.

4. The method of claim 1 wherein the metal is present in the spent catalyst in an amount of from about 0.1 wt. % to about 50 wt. % by total weight of the spent catalyst.

5. The method of claim 1 wherein the redispersing composition further comprises water.

6. The method of claim 1 wherein the chlorine-containing compound comprises hydrochloric acid, chlorine, carbon tetrachloride, tetrachloroethylene, chlorobenzene, methyl chloride, methylene chloride, chloroform, allyl chloride, trichloroethylene, chloramines, chlorine oxides, chlorine acids, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, or combinations thereof.

7. The method of claim 1 wherein the spent catalyst is contacted with the redispersing composition for a period of from about 1 minute to about 100 hours in a temperature range of from about 100° C. to about 1000° C.

8. The method of claim 1 wherein the redispersing composition comprises hydrochloric acid and water in a $H_2O$ to HCl ratio of from about 0.01:1 to about 10:1.

9. The method of claim 1 wherein the reactivating composition comprises a gas phase halogenating agent, a liquid phase halogenating agent, or combinations thereof, and wherein the reactivating composition comprises a fluorine-containing compound.

10. The method of claim 9 wherein the fluorine-containing compound comprises an organic ammonium halide represented by the general formula $N(R)_4F$, where R represents a hydrogen or a substituted or unsubstituted carbon chain molecule having from about 1 to about 20 carbons wherein each R may be the same or different.

11. The method of claim 9 wherein the fluorine-containing compound comprises hydrofluoric acid, fluorine, 2,2,2-trifluoroethanol, tetrafluoroethylene, carbon tetrafluoride, carbon trifluoride, fluoromethane, heptafluoropropane, decafluorobutane, hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, or combinations thereof.

12. The method of claim 10 wherein the organic ammonium halide comprises at least one hydrofluoric acid and at least one ammonium hydroxide represented by the formula $N(R')_4OH$, where R' is hydrogen or a substituted or unsubstituted carbon chain molecule having from about 1 to about 20 carbon atoms wherein each R' may be the same or different.

13. The method of claim 10 wherein the organic ammonium halide comprises ammonium fluoride, tetramethylammonium fluoride, tetraethylammonium fluoride, tetrapropylammonium fluoride, tetrabutylammonium fluoride or combinations thereof.

14. The method of claim 1 wherein the redispersed spent catalyst is contacted with the reactivating composition for a period of from about 1 minute to about 100 hours in the temperature range of from about 0° C. to about 1000° C.

15. The method of claim 1 further comprising drying the spent catalyst; the redispersed spent catalyst; the redispersed reactivated spent catalyst; or combinations thereof in a temperature range of from about 0° C. to about 250° C.

16. The method of claim 1 further comprising calcining the spent catalyst; the redispersed spent catalyst; the redispersed reactivated spent catalyst; or combinations thereof in a temperature range of from about 25° C. to about 1000° C.

17. The method of claim 1 wherein the spent catalyst; the redispersed spent catalyst; or combinations thereof is contacted with the reactivating composition in the presence of weak base.

18. The method of claim 17 wherein the weak base comprises ethylene diamine.

19. The method of claim 1 wherein thermally treating the redispersed, reactivated spent catalyst comprises heating in a temperature range of from about 25° C. to about 1000° C.

20. The method of claim 1 wherein the reactivated catalyst has an activity of from about 0.001x to about 0.95x wherein x is the activity of an otherwise similar fresh catalyst.

21. The method of claim 1 further comprising, before redispersing the metal in the spent catalyst, decoking the spent catalyst.

22. The method of claim 1 wherein steps c, d, or combinations thereof are further carried out in the presence of $O_2$.

23. The method of claim 1 wherein the $O_2$ concentration within the redispersing composition is from about 0.01 mol % to about 20 mol %.

24. A method comprising:
    (a) employing a fresh aromatization catalyst in one or more reaction zones for a time period sufficient to produce a spent catalyst;
    (b) reducing the amount of carbonaceous material associated with the spent catalyst to produce a decoked catalyst;
    (c) contacting the decoked catalyst with a redispersing composition comprising $O_2$ and a chlorine-containing compound at a temperature of at least 100° C. to produce a redispersed catalyst;
    (d) contacting the redispersed catalyst with a reactivating composition to produce a reactivated spent catalyst; and
    (e) thermally treating the reactivated catalyst to produce a thermally treated catalyst.

25. The method of claim 24 wherein the chlorine-containing compound comprises hydrochloric acid, chlorine, carbon tetrachloride, tetrachloroethylene, chlorobenzene, methyl chloride, methylene chloride, chloroform, allyl chloride, trichloroethylene, chloramines, chlorine oxides, chlorine acids, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, or combinations thereof.

26. The method of claim 24 wherein the reactivating composition comprises a gas phase halogenating agent, a liquid phase halogenating agent, or combinations thereof, and wherein the reactivating composition comprises a fluorine-containing compound.

* * * * *